United States Patent [19]
Matsumoto

[11] Patent Number: 5,675,836
[45] Date of Patent: Oct. 7, 1997

[54] METHOD OF PROCESSING RECORDING MEDIA AND APPARATUS FOR PROCESSING RECORDING MEDIA

[75] Inventor: Nobuo Matsumoto, Kanagawa, Japan

[73] Assignee: Fuji Photo Film Co., Ltd., Kanagawa, Japan

[21] Appl. No.: 614,270

[22] Filed: Mar. 12, 1996

[30] Foreign Application Priority Data

Mar. 13, 1995 [JP] Japan .................................. 7-052533
Apr. 27, 1995 [JP] Japan .................................. 7-104401

[51] Int. Cl.⁶ .......................... G03D 13/00; B65H 39/10
[52] U.S. Cl. ...................... 396/564; 271/298; 271/300; 396/612
[58] Field of Search ........................ 396/612, 564; 271/184, 225, 267, 298, 300; 355/27, 75, 76

[56] References Cited

U.S. PATENT DOCUMENTS

| | | | |
|---|---|---|---|
| 4,126,391 | 11/1978 | Nishimoto | 396/612 |
| 4,705,376 | 11/1987 | Schaub et al. | 396/612 |
| 5,430,520 | 7/1995 | Toki et al. | 396/612 |

FOREIGN PATENT DOCUMENTS

| | | | |
|---|---|---|---|
| 58-29464 | 6/1983 | Japan | G03D 3/00 |
| 4106537 | 4/1992 | Japan | G03B 27/00 |
| 6332144 | 12/1994 | Japan | G03D 13/00 |

*Primary Examiner*—D. Rutledge
*Attorney, Agent, or Firm*—Sughrue, Mion, Zinn, Macpeak & Seas, PLLC

[57] ABSTRACT

An apparatus for processing recording media includes: a recording device recording image information recorded on a first recording medium onto a sheet-shaped second recording medium; a conveying/processing device effecting a predetermined processing while conveying the second recording medium onto which the image information has been recorded; a conveying device, provided between the recording device and the conveying/processing device, for enabling switching of a second recording medium received from the recording device between a held state and a non-held state, and for enabling the second recording medium to be sent out in a held state; a first moving mechanism for, after the conveying device receives the second recording medium, moving the conveying device in a second recording medium transverse direction which intersects a second recording medium sending-out direction; and a second moving device for, when the conveying device receives the second recording medium, moving the conveying device in a first direction having a component in a thickness direction of the second recording medium to position the conveying device at a first position, and for, when the conveying device sends out the second recording medium, moving the conveying device in a second direction opposite to the first direction to position the conveying device at a second position. Even if a speed of sending out the second recording medium from the recording device is fast and a conveying speed of the conveying/processing device is slow, the conveying device can absorb a difference in speeds.

23 Claims, 20 Drawing Sheets

METHOD OF PROCESSING RECORDING MEDIA AND APPARATUS FOR PROCESSING RECORDING MEDIA

BACKGROUND OF THE INVENTION

1. Field of the Invention

The present invention relates to a method of processing recording media and an apparatus for processing recording media, and in particular, to a method of processing recording media and apparatus for processing recording media in a case in which a predetermined processing is carried out while recording media are being conveyed in a plurality of rows.

2. Description of the Prior Art

In a photographic printing processing apparatus, generally, a roll-shaped photosensitive material is continuously paid out and images of a negative film are print-exposed thereon per frame on an exposure stand provided in an exposure section. Thereafter, the photosensitive material is conveyed by a conveying device to a developing processing section where the photosensitive material is subject to developing processing while passing through tanks in which various types of developing processing solutions are housed. The photosensitive material is subject to drying processing thereafter.

For the sake of expediency in the developing processing, the photosensitive material which is print-exposed on the exposure stand is cut per frame in advance either before print-exposure or before being conveyed into the developing processing section. The cut photosensitive materials are sent in a row into the developing processing section.

In the developing processing section, in order to prevent the cut photosensitive materials from contacting each other which leads to non-uniform developing processing, the cut photosensitive materials are conveyed with intervals of a few millimeters to a few tens of millimeters therebetween.

However, when attempts are made to improve the processing capability of the above-described conventional photographic printing processing apparatus, in order to increase the number of cut photosensitive materials processed per unit time, a method has been employed in which the lengths of racks of the processing devices which convey the photosensitive materials in the developing processing section are increased. The processing speed in the developing processing section increases in accordance with the increase in the rack lengths. However, when the rack lengths are increased, the tanks which house the racks become larger. Drawbacks arise in that the amounts of the mother liquors of the developing processing solutions increase, and the entire developing processing section becomes longer.

In order to overcome these drawbacks, methods have been proposed to improve the processing capability by distributing in parallel rows the photosensitive materials sent into the developing processing section, as in Japanese Utility Model Application Publication No. 58-29464 and Japanese Patent Application Laid-Open Nos. 4-106537 and 6-332144. This method is advantageous in that the processing capability for narrow photosensitive materials improves, and even wide photosensitive materials can be processed.

However, when exposure is carried out in a single row and developing processing is carried out in plural rows, if the conveying speed of the photosensitive materials discharged from the print-exposure section is not greater than the conveying speed of the photosensitive materials in the developing processing section, the capability of the developing processing section cannot be utilized effectively. In order to make the conveying speed of the photosensitive materials discharged from the print-exposure section faster than the conveying speed of the photosensitive materials in the developing processing section so as to utilize the capability of the developing processing section, an accumulator is needed either before or after the distributing section. As a result, a long conveying distance becomes necessary, as does space in the conveying direction. Drawbacks arise in that the apparatus becomes larger and costs increase.

SUMMARY OF THE INVENTION

In view of the aforementioned, an object of the present invention is to provide a method of processing recording media and an apparatus for processing recording media in which the conveying distance when recording media are conveyed in parallel can be made shorter.

A method of processing recording media of a first aspect of the present invention comprises the steps of: (a) successively recording at least one image information recorded on a first recording medium onto second recording media at a recording section; (b) distributing the second recording media, on which the image information has been recorded, into plural rows by a distributing means, wherein when the second recording media are distributed into plural rows, the distributing means receives a subsequently distributed second recording medium from the recording section at a second position which is separated by a predetermined amount in a direction having a component in a direction of thickness of the second recording media, from a first position at which a second recording medium distributed previously by the distributing means is sent out to any one row of the plural rows; and (c) effecting a predetermined processing at a conveying/processing device while successively receiving and conveying in parallel the second recording media which have been sent out.

An apparatus for processing recording media of a second aspect of the present invention comprises recording means for recording image information recorded on a first recording medium onto a sheet-shaped second recording medium; a conveying/processing device for effecting a predetermined processing while conveying the second recording medium onto which the image information has been recorded; first conveying means, provided between the recording means and the conveying/processing device, for enabling switching of a state of a second recording medium received from the recording means between a held state and a non-held state, and for enabling the second recording medium to be sent out therefrom in a held state; second conveying means for receiving the second recording medium sent out from the first conveying means and for sending out the received second recording medium to the conveying/processing device; first moving means for, after the first conveying means has received the second recording medium moving the first conveying means in a transverse direction of the second recording medium which direction intersects a direction in which the second recording medium is sent out to the second conveying means; and second moving means for, when at least one of the first conveying means and the second conveying means receives the second recording medium, moving the at least one of the first conveying means and the second conveying means in a first direction having a component in a direction of thickness of the second recording medium so as to position the at least one of the first conveying means and the second conveying means at a first position, and for, when the at least one of the first conveying means and the second conveying means sends out the second recording medium, moving the at least one of the first conveying means and the second conveying means in a second direction which is opposite to the first direction so as to position the at least one of the first conveying means and the second conveying means at a second position.

An apparatus for processing recording media of a third aspect of the present invention comprises: recording means for recording image information recorded on a first recording medium onto a sheet-shaped second recording medium; a conveying/processing device for effecting a predetermined processing while conveying the second recording medium onto which the image information has been recorded; conveying means, provided between the recording means and the conveying/processing device, for enabling switching of a state of a second recording medium received from the recording means between a held state and a non-held state, and for enabling the second recording medium to be sent out therefrom in a held state; first moving means for, after the conveying means receives the second recording medium, moving the conveying means in a transverse direction of the second recording medium which direction intersects a direction in which the second recording medium is sent out; and second moving means for, when the conveying means receives the second recording medium, moving the conveying means in a first direction having a component in a direction of thickness of the second recording medium so as to position the conveying means at a first position, and for, when the conveying means sends out the second recording medium, moving the conveying means in a second direction which is opposite to the first direction so as to position the conveying means at a second position.

An apparatus for processing recording media of a fourth aspect of the present invention comprises: recording means for recording image information recorded on a first recording medium onto a sheet-shaped second recording medium; a conveying/processing device for effecting a predetermined processing while conveying the second recording medium onto which the image information has been recorded; first conveying means, provided between the recording means and the conveying/processing device, for enabling switching of a state of a second recording medium received from the recording means between a held state and a non-held state, and for enabling the second recording medium to be sent out therefrom in a predetermined direction in a held state; second conveying means having a receiving path, at least one of whose position and direction is different from a position and a direction of a send-out path of the second recording medium through which the second recording medium is sent out from the first conveying means, the second conveying means receiving the second recording medium sent out from the first conveying means and sending out the received second recording medium to the conveying/processing device; guide means, provided between the first conveying means and the second conveying means, for guiding the second recording medium, which was sent out from the first conveying means, to the receiving path of the second conveying means; and moving means for moving the first conveying means in a transverse direction of the second recording medium which direction intersects a direction in which the second recording medium is sent out.

An apparatus for processing recording media of a fifth aspect of the present invention comprises: recording means for recording image information recorded on a first recording medium onto a sheet-shaped second recording medium; a conveying/processing device for effecting a predetermined processing while conveying the second recording medium onto which the image information has been recorded; distributing means, provided between the recording means and the conveying/processing device, for distributing the second recording medium received from the recording means to one of a first conveying path and a second conveying path, respective conveying directions of the first conveying path and the second conveying path being different from a direction having a component in a direction of thickness of the second recording medium; first conveying means having a first conveying portion which is positioned at a second recording medium conveying direction downstream side of the first conveying path, and a second conveying portion, which is positioned at a second recording medium conveying direction downstream side of the second conveying path, the first conveying means enabling switching of a state of a received second recording medium between a held state and a non-held state, and enabling the second recording medium to be sent out therefrom in a held state; moving means for moving the first conveying means in a transverse direction of the second recording medium which direction intersects a direction in which the second recording medium is sent out toward the conveying/processing device; and second conveying means, provided between the first conveying means and the conveying/processing device, for conveying to the conveying/processing device the second recording medium sent out from the first conveying means.

Operation of the method of processing recording media of the first aspect will be described hereinafter.

When image information recorded on a first recording medium is recorded onto second recording media at the recording section, the second recording media on which the image information has been recorded are distributed into a plurality of rows by the distributing means. The distributed second recording media are processed while being conveyed in parallel in the conveying/processing device.

When the second recording media are distributed into a plurality of rows, a subsequently distributed second recording medium is received from the recording section at a position which is separated from the previously distributed second recording medium by a predetermined amount in a direction having a component in the direction of thickness of the second recording media. Therefore, even in cases in which the conveying speed of the second conveying media sent in from the recording section is fast and the conveying speed of the second recording media sent to the conveying/processing device from the distributing means is slow, between the recording means and the conveying/processing device, a preceding second recording medium and the second recording medium conveyed thereafter are separated in a direction having a component in the direction of thickness of the second recording media and the difference in conveying speeds can be absorbed. Accordingly, because there is no need for an accumulator which is needed in conventional apparatuses, the length in the conveying direction can be shortened.

Operation of the apparatus for processing recording media of the second aspect will be described hereinafter.

First, a case in which the first conveying means is moved to the first position and the second position by the second moving means will be described. The image information of a first frame recorded on the first recording medium is recorded onto the second recording medium by the recording means. The second recording medium on which the image information of the first frame has been recorded is sent to the first conveying means. The first conveying means conveys the second recording medium while holding the second recording medium, and stops the second recording medium at a predetermined position.

The first conveying means is moved by the first moving means in the transverse direction of the second recording medium which direction intersects the direction in which the second recording medium is sent out. For example, the first conveying means is moved toward the left side as viewed from a position facing the conveying/processing device.

After the first conveying means is moved to the left, the first conveying means is moved by the second moving means a predetermined distance in a direction having a component in the direction of thickness of the second recording medium (the second direction). The second recording medium is sent out to the second conveying means while being held by the first conveying means. Here, when the conveying direction leading end portion of the second recording medium is conveyed by the second conveying means, the first conveying means sets the second recording medium in a non-held state. The first conveying means is moved by the second moving means a predetermined distance in a direction having a component in the direction of thickness of the second recording medium (the first direction) so as to be separated from the second recording medium by a predetermined dimension.

Next, the first conveying means is moved to the right by the first moving means so as to return to its original position (the first position), and immediately receives the subsequent second recording medium. Here, the second recording medium may be received by the first conveying means before the trailing end portion of the second recording medium conveyed by the second conveying means has entered into the second conveying means.

The first conveying means conveys the subsequent second recording medium while holding the subsequent second recording medium, and stops the subsequent second recording medium at a predetermined position. The first conveying means is, by the first moving means, made to move the subsequent second recording material toward the right side as viewed from a position facing the conveying/processing device, which is the direction opposite the previous time.

After the first conveying means is moved to the right, the first conveying means is moved by the second moving means a predetermined dimension in a direction having a component in the direction of thickness of the second recording medium (the second direction), and this subsequent second recording medium is conveyed to the second conveying means while being held by the first conveying means. Here, when the conveying direction leading end portion of the subsequent second recording medium is conveyed by the second conveying means, the first conveying means sets the second recording medium in a non-held state, and the first conveying means is moved by the second moving means a predetermined distance in a direction having a component in the direction of thickness of the second recording medium (the first direction). Next, the first conveying means is moved to the left by the first moving means so as to return to its original position (the first position), and separates from the second recording medium by a predetermined dimension.

Thereafter, the second recording media are successively distributed alternately, and are conveyed to the conveying/processing device via the second conveying means. The second recording media are conveyed in parallel and are subjected to predetermined processings by the conveying/processing device.

In a case in which the second conveying means is moved to the first position and the second position by the second moving means, the second conveying means is moved by the second moving means to the first position and the second position at the time that the second conveying means receives the second recording medium and at the time that the second conveying means sends out the second recording medium. Other operations are the same as the above-described case in which the first conveying means is moved. Further, in a case in which the second moving means moves both the first conveying means and the second conveying means, the first and second conveying means are moved to the first position and the second position at the time the second recording medium is received and at the time the second recording medium is sent out.

In the apparatus for processing recording media of the present aspect, even if the conveying speed of the second recording media sent in from the recording means is fast and the conveying speed of the second recording media sent to the conveying/processing device from the second conveying means is slow, this difference in speeds can be absorbed by a preceding second recording medium and the second recording medium conveyed thereafter being separated, between the first conveying means and the second conveying means, in a direction having a component in the direction of thickness of the second recording media. Therefore, an accumulator, which is needed in the conventional art, is not necessary. As a result, the length in the conveying direction can be made shorter.

The second recording media may be distributed into three or more rows.

The movement of the first conveying means in the transverse direction, which movement is effected by the first moving means, and the movement of the first conveying means in the direction of thickness, which movement is effected by the second moving means, may be carried out simultaneously.

Operation of the apparatus for processing recording media of the third aspect will be described hereinafter.

First, the image information of the first frame recorded on the first recording medium is recorded onto the second recording medium by the recording means. The second recording medium on which the image information of the first frame has been recorded is sent to the conveying means. The conveying means which receives the second recording medium is positioned at the first position. The conveying means conveys the second recording medium while holding the second recording medium, and stops the second recording medium at a predetermined position.

The conveying means is moved by the first moving means in a transverse direction of the second recording medium which direction intersects the direction in which the second recording medium is sent out. For example, the conveying means is moved toward the left side as viewed from a position facing the conveying/processing device.

After the conveying means is moved to the left, the conveying means is moved by the second moving means a predetermined distance in a direction having a component in the direction of thickness of the second recording medium (the second direction), so as to be positioned at the second position. The second recording medium is conveyed to the conveying/processing device while being held by the conveying means.

Here, when the conveying direction leading end portion of the second recording medium is conveyed by the conveying/processing device, the conveying means sets the second recording medium in a non-held state and is moved by the second moving means a predetermined dimension in a direction having a component in a direction of thickness of the second recording medium (the first direction) so as to separate from the second recording medium by a predetermined dimension.

Next, the conveying means is moved to the right by the first moving means so as to return to its original position (the first position), and immediately receives the subsequent second recording medium. Here, the second recording medium can be received before the trailing end of the second recording medium conveyed by the conveying/processing device enters into the conveying/processing device.

The conveying means conveys the subsequent second recording medium while holding the subsequent second recording medium, and stops the subsequent second recording medium at a predetermined position. The conveying means is, by the first moving means, made to move the subsequent second recording material toward the right side as viewed from a position facing the conveying/processing device, which is the opposite direction as the previous time.

After the conveying means is moved to the right, the conveying means is moved by the second moving means a predetermined distance in a direction having a component in the direction of thickness of the second recording medium (the second direction) so as to be positioned at the second position, and the subsequent second recording medium is conveyed to the conveying/processing device while being held by the conveying means. Here, when the conveying direction leading end portion of the subsequent second recording medium is conveyed by the conveying/processing device, the conveying device sets the subsequent second recording medium in a non-held state, and the conveying means is moved by the second moving means a predetermined dimension in a direction having a component in a direction of thickness of the second recording medium. Next, the conveying means is moved by the first moving means to the left and returns to its original position (the first position) so as to be separated from the subsequent second recording medium by a predetermined distance.

Thereafter, the second recording media are successively distributed alternately, and are conveyed to the conveying/processing device. The second recording media are conveyed in parallel and are subjected to predetermined processings by the conveying/processing device.

In the apparatus for processing recording media of the present aspect, even if the conveying speed of the second recording media sent in from the recording means is fast and the conveying speed of the conveying/processing device is slow, the difference in conveying speeds can be absorbed by separating (setting apart) a preceding second recording medium and the second recording medium conveyed thereafter, between the recording means and the conveying/processing device, in a direction having a component in a direction of thickness of the second recording media. Therefore an accumulator, which is needed in the conventional art, is unnecessary. As a result, the conveying direction length can be shortened.

The second recording media may be distributed into three or more rows as well.

The movement of the conveying means in the transverse direction, which movement is effected by the first moving means, and the movement of the conveying means in the direction of thickness, which movement is effected by the second moving means, may be carried out simultaneously.

Further, in a case in which a second conveying means, which receives the second recording medium from the conveying means and sends the second recording medium out to the conveying/processing device, is additionally provided, the second moving means moves at least one of the conveying means and the second conveying means in a direction having a component in the direction of thickness of the second recording media, so as to separate a preceding second recording medium from the second recording medium conveyed thereafter.

Next, operation of the apparatus for processing recording media of the fourth aspect of the present invention will be described.

First, image information of the first frame recorded on the first recording medium is recorded onto a second recording medium by the recording means. The second recording medium on which the image information of the first frame has been recorded is sent to the first conveying means. The first conveying means conveys the second recording medium while holding the second recording medium, and stops the second recording medium at a predetermined position.

The first conveying means is moved by the moving means in a transverse direction of the second recording medium which direction intersects the direction in which the second recording medium is sent out. For example, the first conveying means is moved toward the left side as viewed from a position facing the conveying/processing device.

When the first conveying means is moved to the left, the second recording medium is conveyed to the second conveying means while being held by the first conveying means. Here, the second recording medium is conveyed to the second conveying means while being guided by the guiding means.

When the conveying direction leading end portion of the second recording medium is conveyed by the second conveying means, the first conveying means sets the second recording medium in a non-held state.

At least one of the position and the direction of a send-out path, through which the first conveying means sends out the second recording medium, and a receiving path, through which the second conveying means receives the second recording medium, is different. Therefore, when the first conveying means sets the second recording medium in a non-held state, the second recording medium separates from the send-out path in a direction having a component in the direction of thickness of the second recording medium, and is conveyed to the receiving path.

In this way, the conveying path of the first conveying means becomes free (open), and the second recording medium on which the next image information is recorded can be received immediately.

When the conveying path of the first conveying means becomes free, the first conveying means is moved to the right by the moving means and returns to its original position, and the subsequent second recording medium is immediately received. Here, the second recording medium can be received before the trailing end of the second recording medium conveyed by the second conveying means enters into the second conveying means.

The first conveying means conveys the subsequent second recording medium while holding the subsequent second recording medium, and stops the subsequent second recording medium at a predetermined position. The first conveying means, by the moving means, made to move the subsequent second recording medium toward the right side as viewed from a position facing the conveying/processing device, which is the opposite direction as the previous time.

When the first conveying means is moved to the right, this subsequent second recording medium is conveyed to the second conveying means while being held by the first conveying means. Here, the second recording medium is conveyed to the second conveying means while being guided by the guide means.

When the conveying direction leading end portion of the subsequent second recording medium is conveyed by the second conveying means, the first conveying means sets the subsequent second recording medium in a non-held state.

As described above, the second recording medium is separated from the send-out path in a direction having a component in the direction of thickness of the second recording medium, and is conveyed through the receiving path.

Thereafter, the second recording media are successively distributed alternately, and are conveyed to the conveying/ processing device via the second conveying means. The second recording media are conveyed in parallel and are subjected to predetermined processings by the conveying/ processing device.

In the apparatus for processing recording media of the present aspect, even if the conveying speed of the second recording media sent in from the recording means is fast and the conveying speed of the second recording media sent from the second conveying means to the conveying/ processing device is slow, the difference in conveying speeds can be absorbed by separating the preceding second recording medium and the second recording medium conveyed thereafter, between the first conveying means and the second conveying means, in a direction having a component in a direction of thickness of the second recording media. Therefore, an accumulator, which is needed in the conventional art, is unnecessary. As a result, the conveying direction length can be shortened.

When the conveying direction leading end portion of the second recording medium is conveyed by the second conveying means, the first conveying means sets the second recording medium in a non-held state. At this time, the second recording medium may actively be separated from the conveying means by blowing air or the like.

The second recording media may be distributed into three rows or more as well.

Operation of the apparatus for processing recording media of the fifth aspect of the present invention will be described hereinafter.

First, image information of the first frame recorded on the first recording medium is recorded onto a second recording medium by the recording means. The second recording medium on which the image information of the first frame has been recorded is distributed by the distributing means to, for example, the first conveying portion of the first conveying means. The first conveying portion conveys the second recording medium while holding the second recording medium, and stops the second recording medium at a predetermined position.

The first conveying means is moved by the moving means in a transverse direction of the second recording medium which direction intersects the direction in which the second recording medium is sent out to the conveying/processing device. For example, the first conveying means is moved to toward the left side as viewed from a position facing the conveying/processing device.

When the first conveying means is moved to the left, the second recording medium is conveyed to the second conveying means while being held by the first conveying portion. Here, when the conveying direction leading end portion of the second recording medium is conveyed by the second conveying means, the first conveying means sets the second recording medium in a non-held state, and is moved to the right by the moving means so as to return to its original position.

Next, image information of the second frame recorded on the first recording medium is recorded onto a second recording medium by the recording means. The second recording medium on which the image information of the second frame has been recorded is distributed by the distributing means to the second conveying portion of the first conveying means. The second conveying portion conveys the second recording medium while holding the second recording medium, and stops the second recording medium at a predetermined position.

The first conveying means is moved by the moving means toward the right side as viewed from a position facing the conveying/processing device. When the first conveying means is moved to the right, the second recording medium is conveyed to the second conveying means while being held by the second conveying portion. Here, when the conveying direction leading end portion of the second recording medium is conveyed by the second conveying means, the first conveying means sets the second recording medium in a non-held state, and is moved by the moving means to the left so as to return to its original position.

Thereafter, the second recording media are successively distributed alternately, and are conveyed to the conveying/ processing device via the second conveying means. The second recording media are conveyed in parallel and are subjected to predetermined processings by the conveying/ processing device.

In the apparatus for processing recording media of the present aspect, even if the conveying speed of the second recording media sent in from the recording means is fast and the conveying speed of the second recording media sent from the second conveying means to the conveying/ processing device is slow, the difference in conveying speeds can be absorbed by the distributing means and the first conveying means separating a preceding second recording medium and a second recording medium conveyed thereafter, in a direction having a component in a direction of thickness of the second recording media. Therefore, an accumulator, which is needed in the conventional art, is unnecessary. As a result, the conveying direction length can be shortened.

The second recording media may be distributed into three rows or more as well.

DESCRIPTION OF THE PREFERRED EMBODIMENTS

An embodiment of the present invention will be described on the basis of the drawings.

Figure 1:
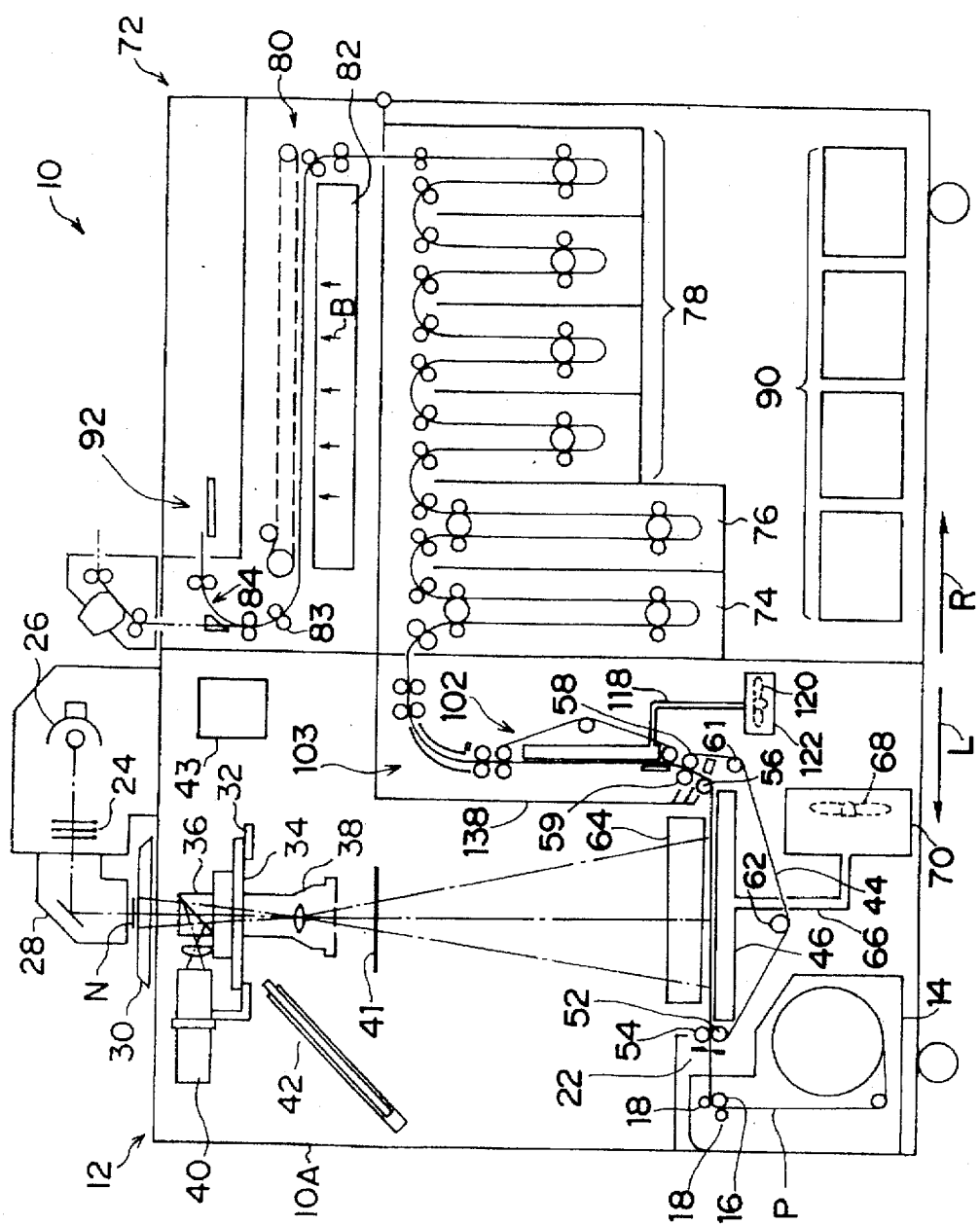
FIG. 1 is a side view illustrating the structure of the interior of a printer processor.

The basic structure of a printer processor 10 which is a photographic printer is illustrated in FIG. 1. A photographic printing section 12, which forms a printer section of the printer processor 10, is structured such that a paper magazine 14 can be loaded therein. The paper magazine 14 accommodates a photographic printing paper P serving as a second recording medium.

A drive roller 16, about which a vicinity of the leading end portion of the photographic printing paper P is entrained, is supported so as to be freely rotatable within the paper magazine 14 at the upper left side thereof in FIG. 1. The drive roller 16 receives the drive force of an unillustrated motor within the photographic printing section 12 and is rotated thereby. A pair of nip rollers 18 are disposed at positions opposing the drive roller 16 with the photographic printing paper P therebetween. As a result, the photographic printing paper P is nipped between the drive roller 16 and the nip rollers 18 and is sent out to the interior of the photographic printing section 12.

A cutter 22 is disposed in the photographic printing section 12. The cutter 22 is formed from a pair of blades, i.e., an upper blade and a lower blade. The blades are moved by a motor 20. The cutter 22 promptly cuts the photographic printing paper P which has exited from the paper magazine 14.

A supporting stand 46, whose top surface is formed along a horizontal direction (the left-and-right directions in FIG. 1), is disposed at the downstream side of the cutter 22 in the conveying direction of the photographic printing paper P, i.e., at the right side of the cutter 22 in FIG. 1.

Figure 2:
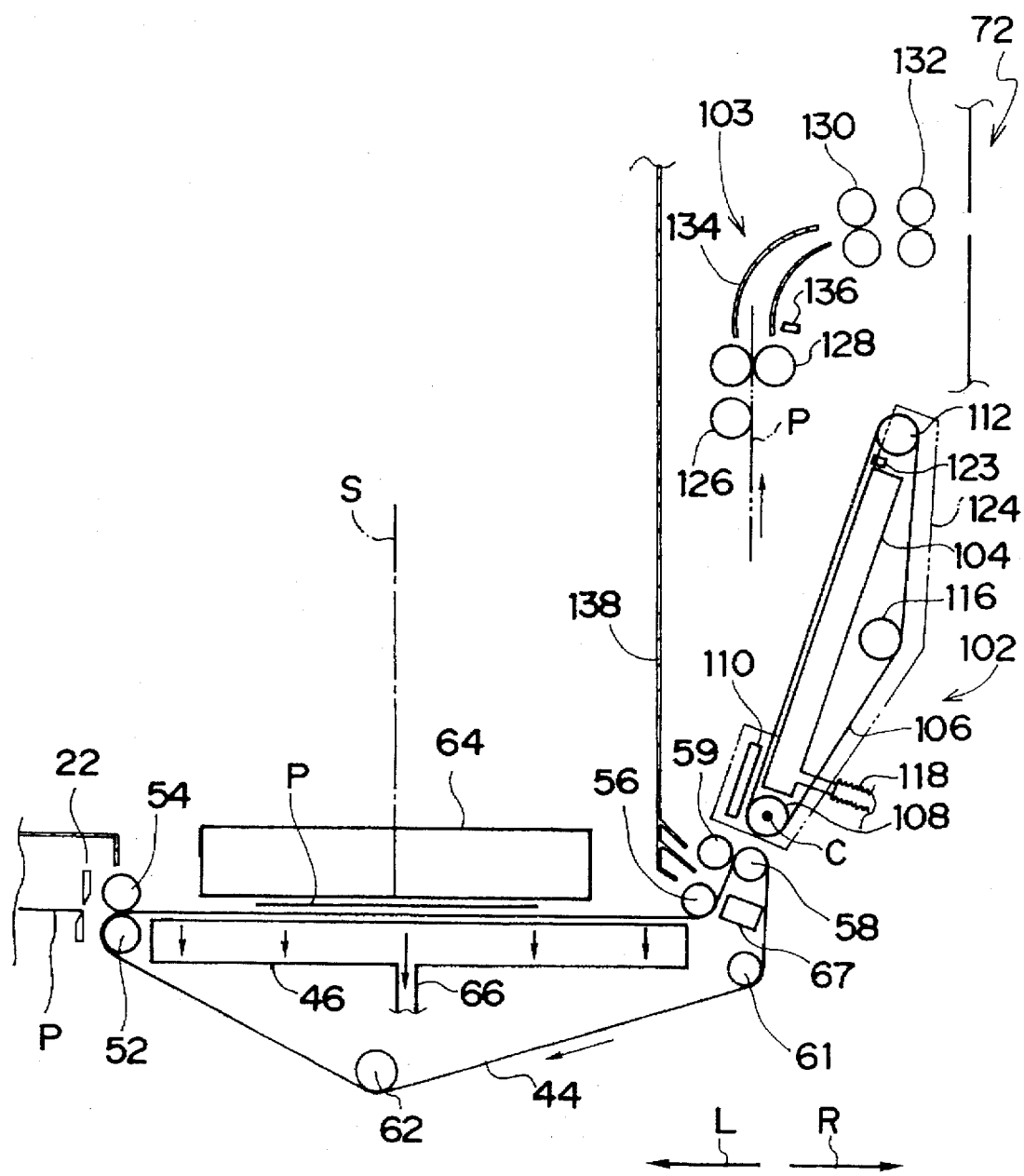
FIG. 2 is a side view of an exposure section and a distributing device.

As illustrated in FIGS. 1 and 2, an entraining roller 52 is disposed in a horizontal direction (the direction orthogonal to the paper surface of FIGS. 1 and 2) between the supporting stand 46 and the cutter 22. Two endless belts 44 are entrained about the entraining roller 52 with a predetermined interval between the two endless belts 44. A nip roller 54 is disposed above the entraining roller 52 such that the endless belts 44 are nipped between the nip roller 54 and the entraining roller 52.

A guide roller 56, which contacts the outer peripheral surfaces of the endless belts 44 and rotates, is positioned at the downstream side of the supporting stand 46 in the conveying direction of the photographic printing paper P.

A character printing unit 67 is disposed at the reverse surface side of the endless belts 44 at the right side of the guide roller 56. The character printing unit 67 effects predetermined printing of characters (frame numbers or the like) on the reverse surfaces of the photographic printing paper P from the gap between the endless belts 44.

An entraining roller 58, about which the endless belts 44 are entrained, is disposed at the upper right of the guide roller 56. A presser roller 59 is disposed at the left side of the entraining roller 58 and presses the outer peripheries of the endless belts 44.

An entraining roller 61, about which the endless belts 44 are entrained, is disposed beneath the entraining roller 58. The endless belts 44 are entrained about a tension roller 62 beneath the supporting stand 46. The entraining roller 58 is driven and rotated by the drive force of an unillustrated motor and rotates the endless belts 44 in the clockwise direction in FIGS. 1 and 2.

A plurality of small holes (unillustrated) are formed in the entire endless belts 44. A plurality of hole portions (unillustrated) are formed, so as to correspond to the small holes of the endless belts 44, in the top surface of the supporting stand 46 on which respective portions of the endless belts 44 are disposed. The interior of the supporting stand 46 is hollow. A pair of communicating ducts 66 (only one is illustrated in the figures), which are formed so as to correspond to the transverse direction ends of the endless belts 44, are connected to the supporting stand 46 and to a fan box 70 provided with a suction fan 68.

An easel device 64 is provided above the respective portions of the endless belts 44 which portions move on the supporting stand 46. In cases in which an image with borders is print-exposed onto the photographic printing paper P, the periphery of the photographic printing paper P is covered by an unillustrated movable member within the easel device 64.

A diffusion box 28 which diffuses light is disposed at a position directly above the easel device 64 and above a casing 10A. A CC filter 24 is disposed next to the diffusion box 28 at the right side thereof. The CC filter 24 is formed from three filters of C, M, Y which can move such that the respective amounts of the filters inserted into the optical path can be changed. Accordingly, after a light beam illuminated from a light source 26 positioned next to the CC filter 24 has been transmitted through the CC filter 24, the light beam is bent while being diffused by the diffusion box 28 and is sent downwardly. Then, the light beam passes through a negative film N, serving as a first recording medium, which is on a negative carrier 30 disposed on the top surface of the casing 10A.

The negative film N of the present embodiment is a regular 135 size negative film. As is common practice in the art, frame numbers or bar codes corresponding to the frame numbers or the like are provided at the perforation sides of the respective images.

A supporting plate 34 is supported, so as to be movable in a horizontal direction (the direction orthogonal to the paper surface in FIG. 1), by a guide rail 32 disposed within the photographic printing portion 12. A prism 36 and a zoom lens 38 are mounted to the supporting plate 34 so as to be disposed on the optical axis S of the light beam.

Accordingly, the light beam, which has passed through the negative film N and has become an exposure light beam, passes through the prism 36. Thereafter, the light beam passes through the zoom lens 38 which can change the enlargement magnification, and forms the image of the negative film N on the photographic printing paper P positioned below the easel device 64.

A density measuring device 40, which measures the density of the negative film N and which is formed by, for example, color filters and a light sensor such as a CCD or the like, is disposed within the photographic printing section 12. A light beam which has been bent in the horizontal direction by the prism 36 is sent to the density measuring device 40. The density measuring device 40 is connected to a controller 43 serving as a control device. The exposure correction value at the time of printing exposure is set on the basis of data measured by the density measuring device 40 and data key-inputted by an operator.

A black shutter 41 is provided on the optical path between the zoom lens 38 and the easel device 64. The black shutter 41 print-exposes for a predetermined time the light whose color and intensity have been adjusted at the CC filter 24 and which has passed through the negative film N.

As illustrated in FIG. 2, above the entraining roller 58 and the presser roller 59, a first conveying unit 102 is disposed at a conveying direction upstream side and a second conveying unit 103 is disposed at a conveying direction downstream side.

Figure 6:
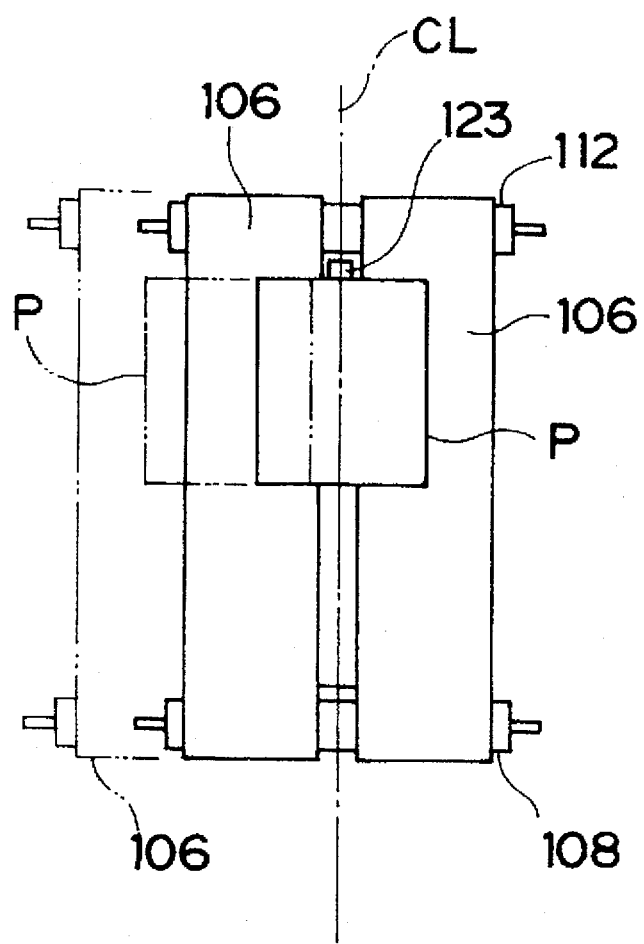
FIG. 6 is a plan view of endless belts and illustrates a state in which a photographic printing paper is sucked.

The first conveying unit 102 is provided with a supporting stand 104. An entraining roller 108 about which endless belts 106 are entrained is disposed in a horizontal direction (in the direction orthogonal to the paper surface of FIG. 2) at the entraining roller 58 side of the supporting stand 104. As illustrated in FIG. 6, two endless belts 106 are entrained about the entraining roller 108 with a predetermined interval between the endless belts 106.

As shown in FIG. 2, a character printing unit 110, which prints characters or the like on the photosensitive surface of the photographic printing paper P, is disposed at the left side of the entraining roller 108.

An entraining roller 112 about which the endless belts 106 are entrained is positioned at the downstream side of the supporting stand 104 in the conveying direction of the photographic printing paper P. The endless belts 106 are entrained about a tension roller 116 at the right side of the supporting stand 104 such that substantially triangular loci of movement are formed.

Figure 16:
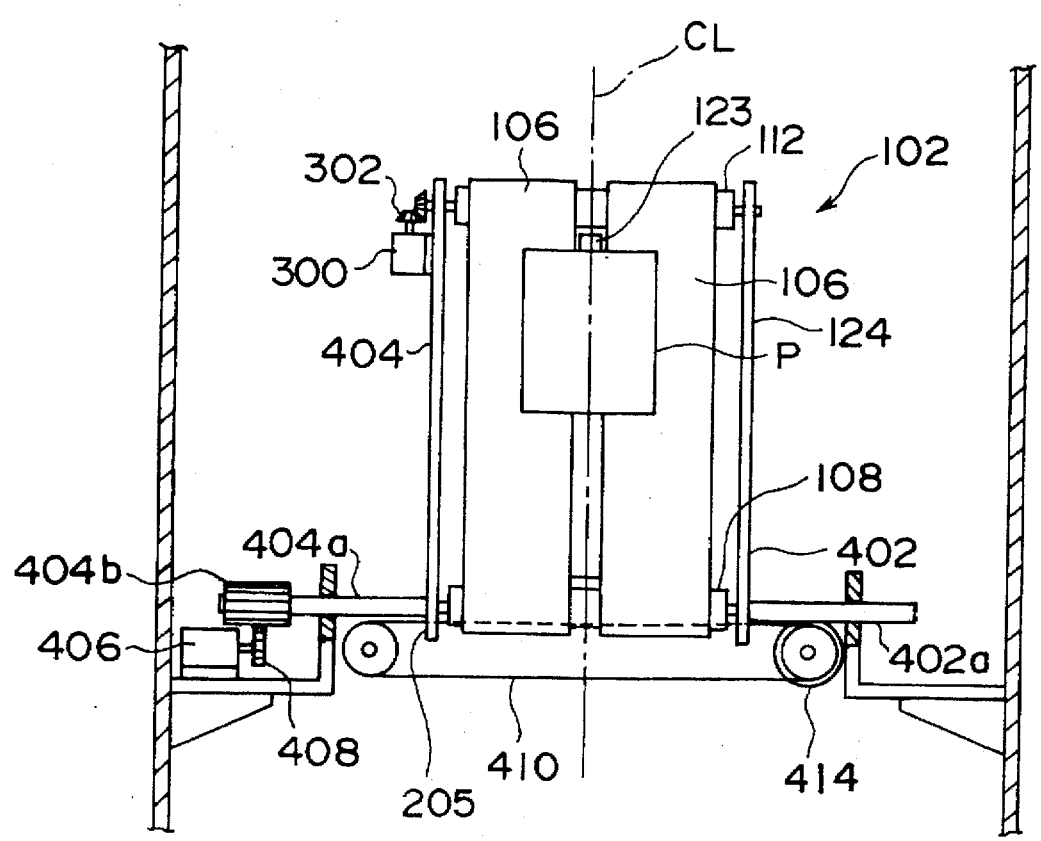
FIG. 16 is a partial perspective view for explaining a first motor mechanism and a second motor mechanism of the first embodiment.

The entraining roller 112 is driven and rotated by a motor 300 and a gear mechanism 302 (see FIG. 16), and rotates the endless belts 106 in the clockwise direction in FIG. 2. The motor 300 is connected to the controller 43, and the driving of the motor 300 is controlled by the controller 43.

A plurality of small holes (unillustrated) are formed in the entire endless belts 106. A plurality of hole portions (unillustrated) are formed, so as to correspond to the small holes of the endless belts 106, in the portions of the supporting stand 104 on which respective portions of the endless belts 106 rest.

The interior of the supporting stand 104 is hollow. A flexible communicating duct 118 is connected to the supporting stand 104. As shown in FIG. 1, the flexible duct 118 is connected to a fan box 122 provided with a suction fan 120.

A sensor 123 which detects the photographic printing paper P is provided between the entraining roller 112 and the supporting stand 104.

As illustrated in FIG. 2, in the first conveying unit 102, the supporting stand 104, the entraining roller 108, the entraining roller 112, the tension roller 116, the character printing unit 110, the sensor 123, the motor 300 (see FIG. 16), and the gear mechanism 302 (see FIG. 16) are attached integrally to a frame 124 so as to form a unit.

Figure 3:
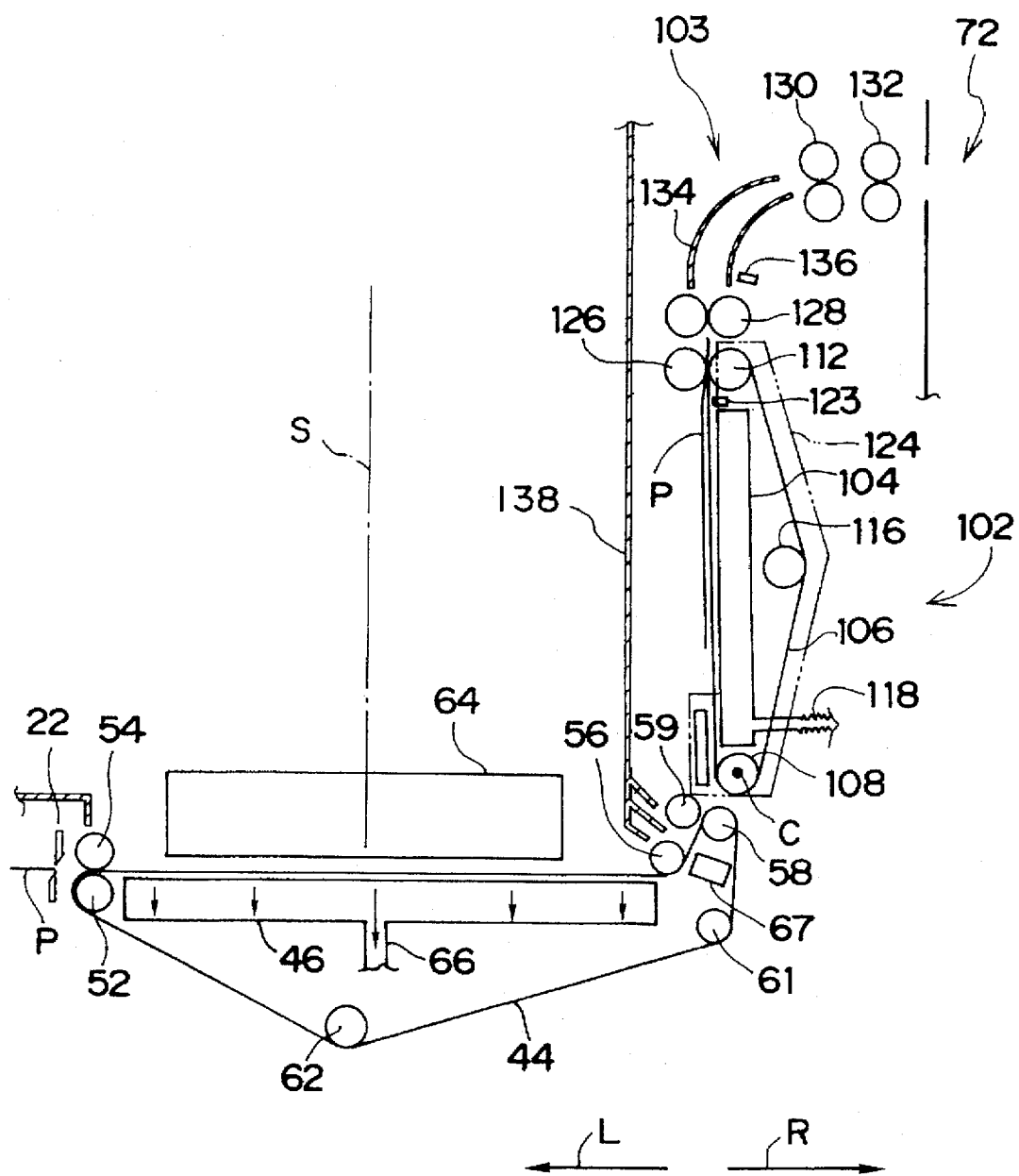
FIG. 3 is a side view of the exposure section and the distributing device.

The frame 124 is provided so as to be swingable between the inclined position illustrated in FIG. 2 and the vertical position illustrated in FIG. 3, around a center of rotation C of the entraining roller 108. A nip roller 126 is disposed at the first conveying unit 102 to the left of the upper entraining roller 112. When the frame is swung counterclockwise so as to be set in a vertical state, the endless belts 106 are nipped between the nip roller 126 and the entraining roller 112, and a photographic printing paper P nipped between the endless belts 106 and the nip roller 126 is conveyed vertically upward.

The frame 124 is provided so as to slide along the direction orthogonal to the paper surface of the figures.

The frame 124 is driven in the swinging directions by a first motor mechanism (corresponding to the second moving means of the present invention), and is driven in the sliding directions by a second motor mechanism (corresponding to the first moving means of the present invention). The first motor mechanism and the second motor mechanism will be described in detail hereinafter with reference to FIGS. 16 through 18.

The frame 124 is provided with a pair of side plates 402, 404. Rods 402a, 404a extend outwardly from the side plates 402, 404, respectively, coaxially with the roller 108. The rods 402a, 404a are movable in the axial directions thereof, and are rotatably supported at the main body frame of the printer processor 10. A gear 404b, which is an elongated gear, is fixed to the rod 404a. Further, a forward/reverse motor 406, which is connected to and controlled by the controller 43, and a gear mechanism 408, which is driven forwardly and reversely by the motor 406, are supported at the main body frame of the printer processor 10. Even if the frame 124 is moved to the left or the right in FIG. 16, because the gear 404b is elongated, the engaged state of the gear mechanism 408 and the gear 404b is maintained, and the gear 404b is driven forward or backward via the driving force of the motor 406 so as to pivot (swing) the frame 124 to the state illustrated in FIG. 2 or the state illustrated in FIG. 3. In this way, the frame 124 is swung by the first motor mechanism.

Figure 17:
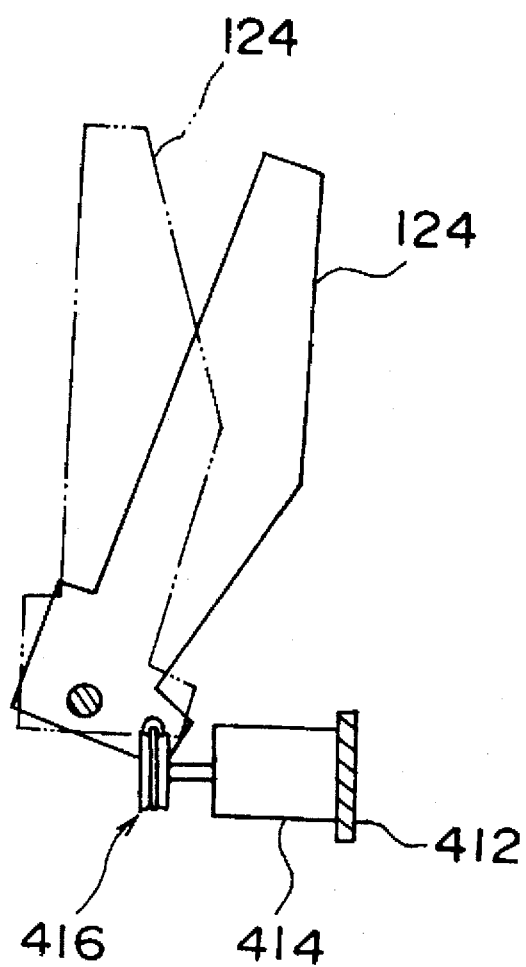
FIG. 17 is a schematic side view for explaining the second motor mechanism of the first embodiment.
Figure 18:
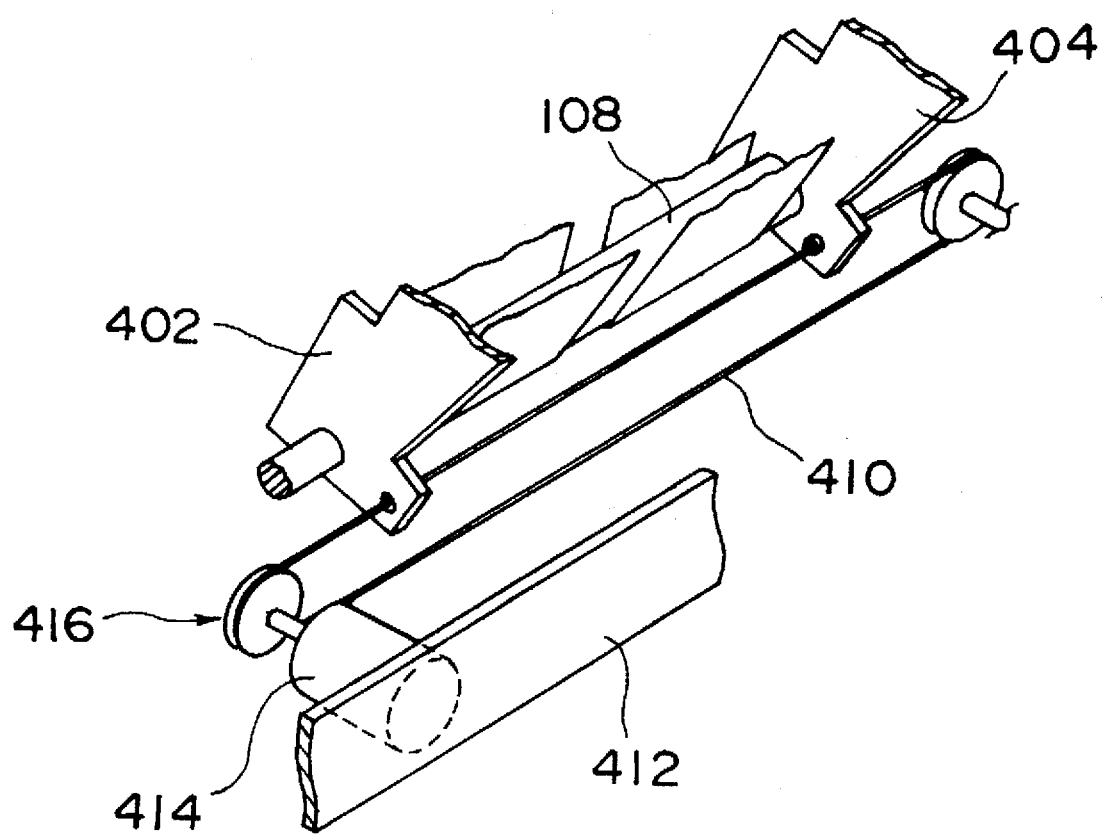
FIG. 18 is a partial perspective view for explaining the second motor mechanism of the first embodiment.

As illustrated in FIGS. 17 and 18, a wire 410 is suspended between the side plates 402, 404 of the frame 124. Further, a forward/reverse motor 414, which is connected to and controlled by the controller 43, and a pulley mechanism 416, which is driven by the motor 414, are supported at a portion 412 of the main body frame of the printer processor 10. The pulley mechanism 416 is always engaged with the wire 410. Accordingly, due to the driving of the motor 414, the frame 124 is either slid toward the rear of the paper surface of FIG. 17 or toward the front of the paper surface of FIG. 17. In this way, the frame 124 is driven in the sliding directions by the second motor mechanism.

Note that the nip roller 126 is made long in the axial direction so as to be able to correspond to the movement of the frame 124.

The second conveying unit 103 is disposed between nip rollers 128 and nip rollers 130. The nip rollers 128 are disposed at the conveying direction downstream side of the photographic printing paper P nipped and conveyed by the endless belts 106 and the nip roller 126. The nip rollers 130, together with nip rollers 132, are disposed adjacent to the entrance side of a processor section 72. The second conveying unit 103 is provided with a curved guide 134 for changing the conveying direction of the photographic printing paper P.

One of the nip rollers 128 is divided into a plurality of rollers in the transverse direction of the photographic printing paper P.

A sensor 136 for detecting the photographic printing paper P passing through the curved guide 134 is provided in a vicinity of the entrance to the curved guide 134.

As illustrated in FIG. 1, the first conveying unit 102 and the second conveying unit 103 are covered by a shading plate 138 so that the exposure light beam at the time of image printing is not illuminated onto the photographic printing papers P on which images have already been printed.

Developing solution is accumulated in a developing tank 74 within the processor section 72. The photographic printing paper P is immersed in the developing solution so that developing processing is effected. The photographic printing paper P which has been subjected to developing processing is conveyed to a bleaching/fixing tank 76 which is adjacent to the developing tank 74. Bleaching/fixing solution is accumulated in the bleaching/fixing tank 76. The photographic printing paper P is immersed in the bleaching/fixing solution so that bleaching processing and fixing processing are effected. The photographic printing paper P which has been subjected to fixing processing is conveyed to a washing section 78 which is adjacent to the bleaching/fixing tank 76 and which is formed from a plurality of washing tanks in each of which washing water is accumulated. The photographic printing paper P is immersed in the washing water in the washing tanks so that washing processing is effected. Developing replenishing solution, bleaching/fixing replenishing solution, and replenishing washing water are sent to the developing tank 74, the bleaching/fixing tank 76 and the washing tanks of the washing section 78, respectively, from a plurality of replenishing tanks 90 disposed within the processor section 72, so that the solutions within the respective tanks are replenished.

The photographic printing paper P which has been subjected to washing processing is conveyed to a drying section 80 positioned above the washing section 78. In the drying section 80, the photographic printing paper P is exposed to hot air blown along the direction of arrows B from a chamber 82 disposed beneath the conveying path of the photographic printing paper P, so that the photographic printing paper P is dried.

A conveying path 84 formed by a plurality of pairs of rollers 83 is disposed at the downstream side of the drying section 80 in the conveying direction of the photographic printing paper P. The photographic printing paper P, for which drying processing has been completed and which has been discharged from the drying section 80, is nipped by the plurality of pairs of rollers 83, and is discharged to the exterior of the printer processor 10.

Figure 4:
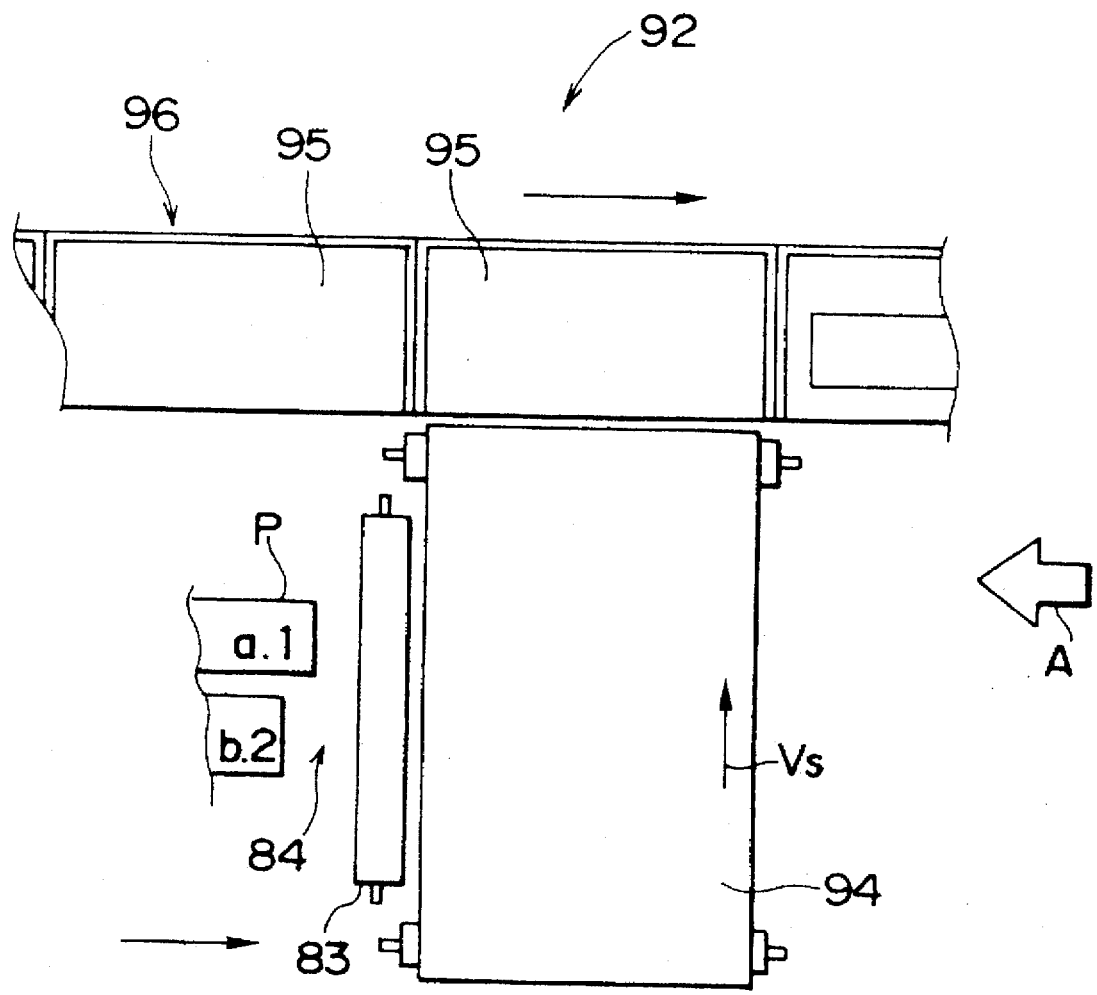
FIG. 4 is a plan view of a sorter portion.
Figure 5:
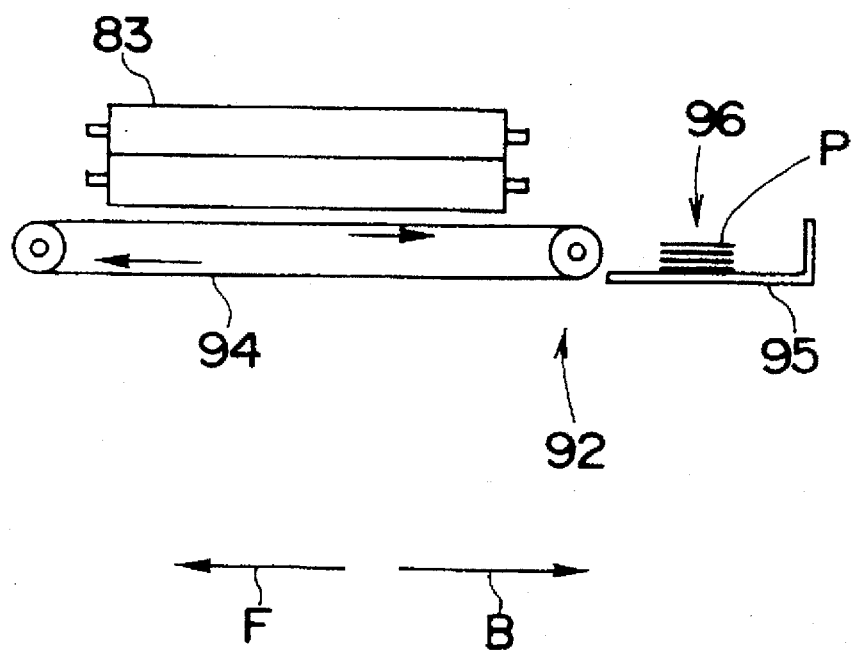
FIG. 5 is a view in the direction of arrow A of the sorter portion illustrated in FIG. 4.

A sorter 92 is provided at the photographic printing paper P discharge side of the conveying path 84. As illustrated in FIGS. 4 and 5, the sorter 92 is provided with a belt conveyor 94 beneath the photographic printing paper P discharge side of the conveying path 84, and with a stacking section 96 beneath the conveying direction downstream side of the belt conveyor 94. The belt conveyor 94 serves as a conveying device for stacking and conveys the photographic printing paper P in a direction orthogonal to the conveying direction of the conveying path 84. The stacking section 96 has a plurality of receiving pans 95 in which photographic printing papers P are stacked. The receiving pans 95 are movable in a direction orthogonal to the conveying direction of the belt conveyor 94 by an unillustrated drive device.

Next, operation of the present embodiment will be described. The following explanation is a description of, for example, a case in which the images recorded on one negative film N are printed such that, for each of the frames, the image of a frame is printed onto one photographic printing paper P.

The unexposed photographic printing paper P sent out from the paper magazine 14 is cut to a desired length at the cutter 22. Thereafter, the cut photographic printing paper P is placed on the endless belts 44 and is conveyed to the image printing position which is a position on the optical axis S of the exposure light beam (see FIG. 2).

When the operator carries out a predetermined operation, the exposure light beam from the light source 26 side reaches the photographic printing paper P via the prism 36, the zoom lens 38 and the like. Due to the black shutter 41 being opened for a predetermined time, the image of the first frame recorded on the negative film N is print-exposed onto the photographic printing paper P.

At this time, the air within the supporting stand 46 is drawn out from within the loop of the endless belts 44 to the transverse direction ends thereof via the communicating ducts 66, and is sucked by the suction fan 68 and blown out to the exterior. Therefore, the interior of the supporting stand 46 is at a negative pressure. The negative pressure is transmitted to the photographic printing paper P on the endless belts 44 via the hole portions in the supporting stand 46 and the small holes in the endless belts 44, so that the photographic printing paper P is sucked to the endless belts 44. As a result, because the photographic printing paper P is not merely set on the endless belts 44 but is sucked thereto, the photographic printing paper P is reliably conveyed by the endless belts 44 and is disposed at image printing position in a horizontal state.

When printing of the image is completed, the photographic printing paper P is nipped by the endless belts 44 and the presser roller 59, and is conveyed at a high speed to the first conveying unit 102.

While the photographic printing paper P is being conveyed from the image printing position to the first conveying unit 102, printing of characters (the frame number or the like) onto the reverse surface of the photographic printing paper P is effected by the character printing unit 67.

Here, at the time the first conveying unit 102 receives the photographic printing paper P, the first conveying unit 102 has been set in advance at the inclined position illustrated in FIG. 2, and as illustrated in FIG. 6, the central position of the endless belts 106 coincides with the transverse direction center CL of the photographic printing paper P which has been transported in by the endless belts 44 and the presser roller 59 (not shown in FIG. 6).

When the photographic printing paper P on which an image has been printed is discharged to the first conveying unit 102, the photographic printing paper P is temporarily held in a standby state on the endless belts 106 as illustrated by the solid line in FIG. 6. The stopping of the conveying of the photographic printing paper P is effected by the leading end thereof being detected by the sensor 123. In this way, preparations for the next exposure can be carried out immediately at the exposure section.

When the date, a message or the like is to be printed on the photographic printing paper P, the date, message or the like is printed by the character printing unit 110 before the photographic printing paper P is conveyed to the standby position.

Here, when the photographic printing paper P is conveyed by the first conveying unit 102, the air within the supporting stand 104 is, via the communicating duct 118, sucked by the suction fan 120 and blown out to the exterior. Therefore, the interior of the supporting stand 104 is at a negative pressure. The negative pressure is transmitted to the photographic printing paper P on the endless belts 106 via the hole portions in the supporting stand 104 and the small holes in the endless belts 106, so that the photographic printing paper P is sucked to the endless belts 106. Accordingly, the photographic printing paper P is reliably conveyed by the endless belts 106, and the planarity of the photographic printing paper P on the endless belts 106 is maintained.

In this way, when the first photographic printing paper P is discharged to the first conveying unit 102, an unexposed photographic printing paper P cut to a predetermined length is immediately conveyed to the image printing position by the endless belts 44, and printing exposure of the image of the second frame is carried out.

The frame 124, holding the first photographic printing paper P on which an image has been printed, is then slid a predetermined amount in either one direction of the transverse directions of the photographic printing paper P (the directions orthogonal to the paper surface of FIG. 2). For example, the frame 124 is slid toward the rear of the paper surface of FIG. 2. The frame 124 is thereby set in the state illustrated by the imaginary line (the two-dotted chain line) in FIG. 6. By the sensor 136 of the second conveying unit 103 detecting the passing of the photographic printing paper P, it can be determined to which row the photographic printing paper P is to be distributed, i.e., the photographic printing paper P can be distributed to the open (free) row.

Next, the frame 124 pivots counterclockwise, and the endless belts 106 are pressed against the nip roller 126.

Thereafter, the endless belts 106 are immediately driven in the clockwise direction. As illustrated in FIG. 3, the leading end of the photographic printing paper P is nipped by the nip rollers 128 at the entrance side of the second conveying unit 103.

When the leading end of the photographic printing paper P is nipped by the nip rollers 128, the sucking of the photographic printing paper P is stopped by stopping the suction fan 120. The frame 124 is immediately pivoted clockwise and is slid a predetermined amount toward the front of the paper surface of FIG. 2 so as to return to its original standby position (the position illustrated by the solid lines in FIG. 6).

In this way, as illustrated by the imaginary line in FIG. 2, the photographic printing paper P is separated from the endless belts 106 by a predetermined dimension, and is, in a vertical state, pulled by the nip rollers 128 at the entrance side of the second conveying unit 103 so as to be conveyed upward. The orientation of the photographic printing paper P is changed at the curved guide 134, and the photographic printing paper P is sent into the processor section 72 via the nip rollers 130, 132. The conveying speed of the second conveying unit 103 is a slow speed so as to conform with the conveying speed of the processor section 72.

When the frame 124 is pivoted clockwise and returns to the standby position, the suction fan 120 is operated, and the second photographic printing paper P is immediately sent into the first conveying unit 102.

When the second photographic printing paper P is conveyed into the first conveying unit 102, it is moved a predetermined amount toward the opposite side of the first photographic printing paper P (i.e., toward the front of the paper surface in FIG. 2), and thereafter is sent into the processor section 72 via the second conveying unit 103.

Thereafter, in the same way as described above, the photographic printing papers P on which images have been printed are alternately distributed by the first conveying unit 102 in transverse directions of the photographic printing paper P orthogonal to the conveying direction of the endless belts 106, and are sent into the processor section 72.

Figure 7A:
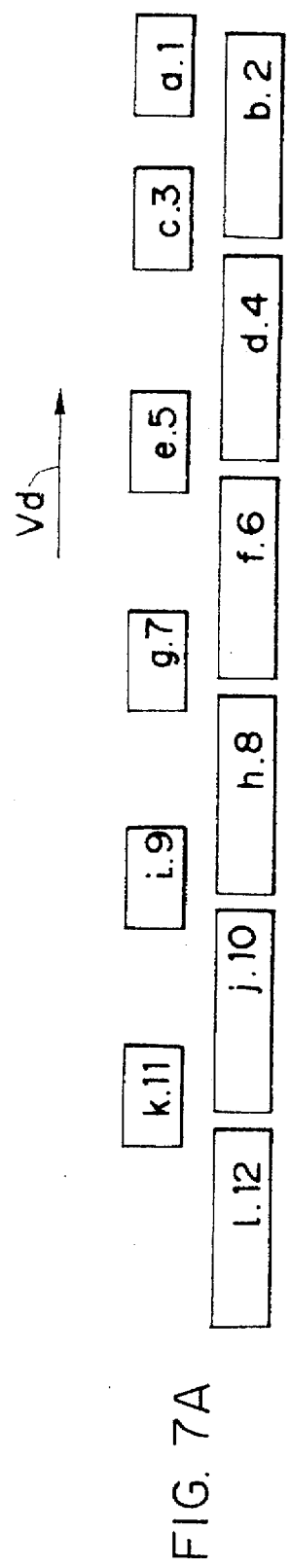
FIGS. 7A and 7B are explanatory views illustrating a state in which photographic printing papers are conveyed in parallel.

In the processor section 72, the photographic printing papers P are subject to developing, bleaching/fixing, washing and drying processings while being conveyed in parallel in two rows as illustrated in FIG. 7A. When the conveying direction trailing end of the photographic printing paper P separates from the last rollers 83 of the conveying path 84, the photographic printing paper P drops onto the belt conveyor 94 provided above the processor section 72.

Images of various different aspect ratios are included among the images recorded on the negative film N. Accordingly, there are various different conveying direction lengths of the photographic printing papers P. If the sending of the photographic printing papers P into the processor section 72 is controlled such that the conveying direction trailing ends of the photographic printing papers P conveyed in the processor section 72 fall in the order of the images recorded on the negative film N (the order of the frame numbers) as illustrated in FIG. 7A, developing processing will end with the photographic printing papers P in their image order. (The numbers on the photographic printing papers P in FIGS. 7A and 7B denote the order of the frames, whereas the letters denote the order of printing.) Therefore, even if the conveying direction lengths of the photographic printing papers P are respectively different, the photographic printing papers P will drop onto the belt conveyor 94 in the order of the images recorded on the negative film N.

The photographic printing papers P which have dropped onto the belt conveyor 94 are conveyed toward the stacking section 96. The photographic printing papers P which have dropped from the end portion of the belt conveyor 94 are stacked in the order of the frame numbers in the receiving pans 95 (i.e., the photographic printing paper P on which the image of frame number 1 is printed is the bottom-most photographic printing paper P).

In the present embodiment, the first conveying unit 102, which moves the photographic printing papers P discharged from the print-exposure section a slight amount in a direction having a component in the direction of thickness of the photographic printing papers P, functions in place of the accumulator used in conventional printer processors. Even if the conveying speed of the photographic printing papers P discharged from the print-exposure section is faster than the conveying speed in the processor section 72, the first conveying unit 102 absorbs the difference in speed, and the capability of the processor section 72 can be utilized. Accordingly, as compared with conventional printer processors requiring an accumulator before or after distribution, the conveying distance of the photographic printing papers P can be made shorter with the printer processor 10 of the present embodiment. As a result, the space in the conveying direction can be made shorter, and the apparatus can be made compact and at a lower cost.

The amount by which the photographic printing paper P is moved in the direction having a component in the thickness direction of the photographic printing paper P may be a slight amount of an extent such that a preceding photographic printing paper P and the photographic printing paper P conveyed thereafter do not contact, and such that the separated photographic printing paper P is not attracted by the next suction operation. Therefore, little moving space is required.

Figure 7B:
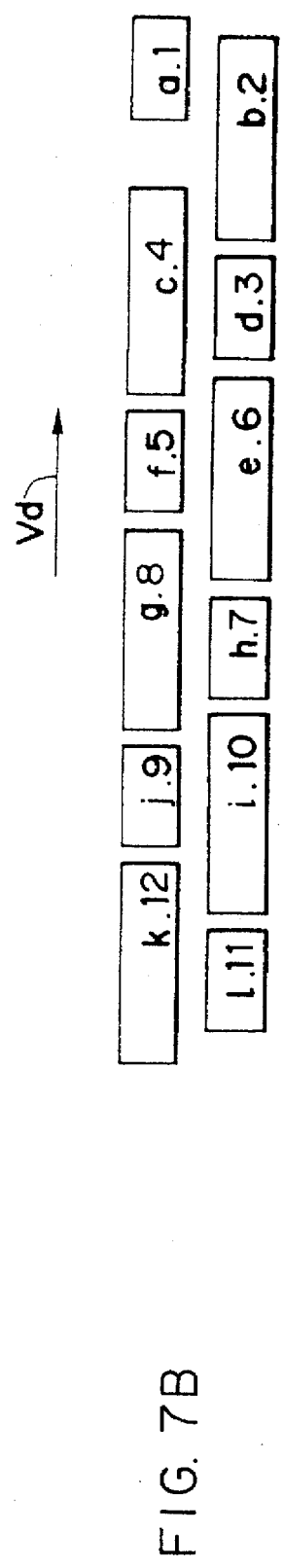

Before printing, if the aspect ratios of images are read for a predetermined number of frames (e.g., the frames of one roll of the negative film N), and the exposure order, the timing for delivery into the processor section 72 and the like are controlled, as shown in FIG. 7B, the entire length can be shortened and efficient processing can be effected.

The printer processor 10 can also process wide photographic printing papers P. In this case, processing is carried out with the first conveying unit 102 in the receiving position shown in FIG. 3 and with the photographic printing papers P not being distributed and being conveyed in a single row.

[Second Embodiment]

A second embodiment of the present invention will be described in accordance with FIGS. 8 and 9. Structures which are the same as those of the above-described embodiment are denoted by the same reference numerals, and description thereof is omitted.

Figure 8:
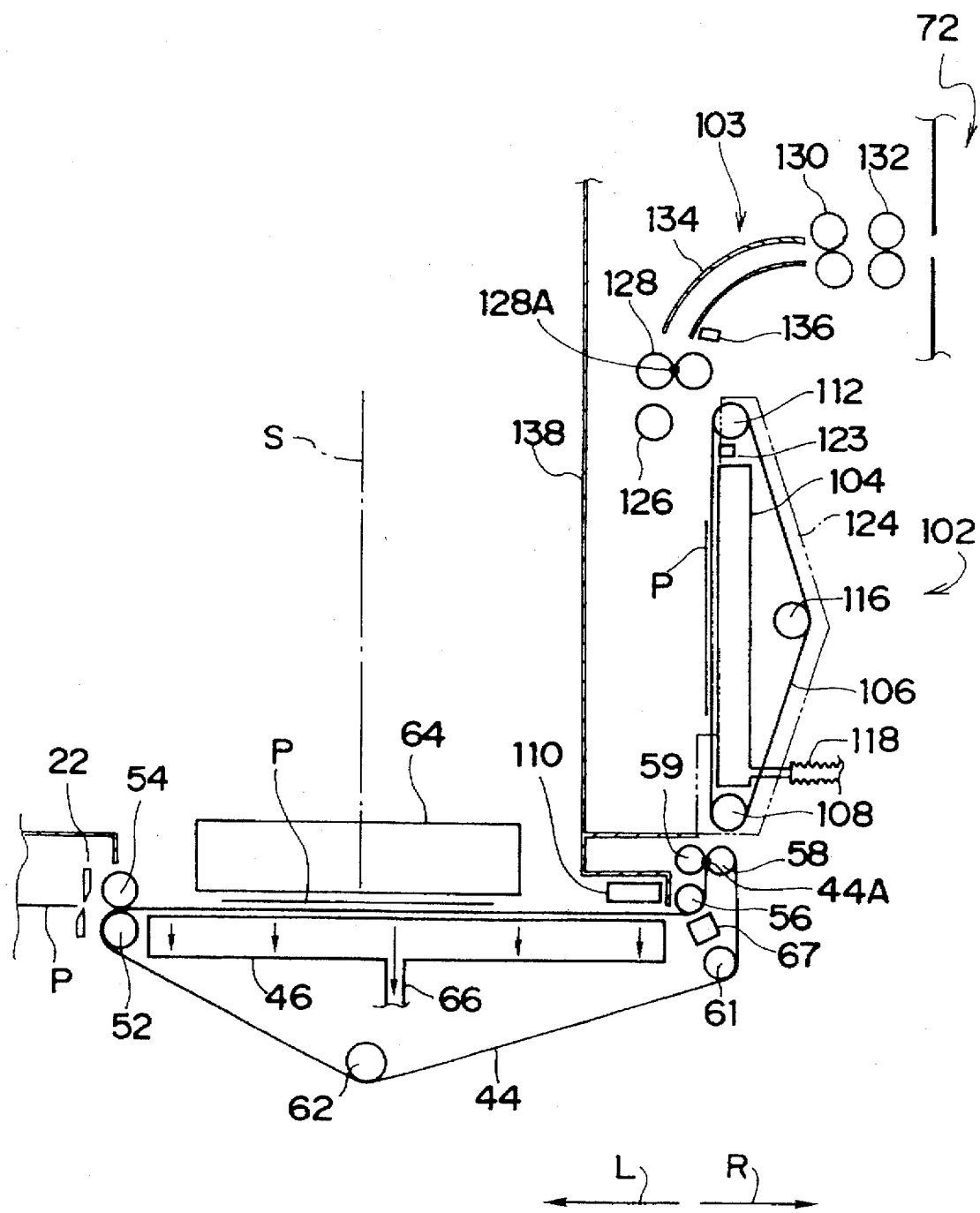
FIG. 8 is a side view, relating to a second embodiment, of an exposure section and a distributing device, and illustrates a state in which a photographic printing paper is held at a first conveying unit.
Figure 9:
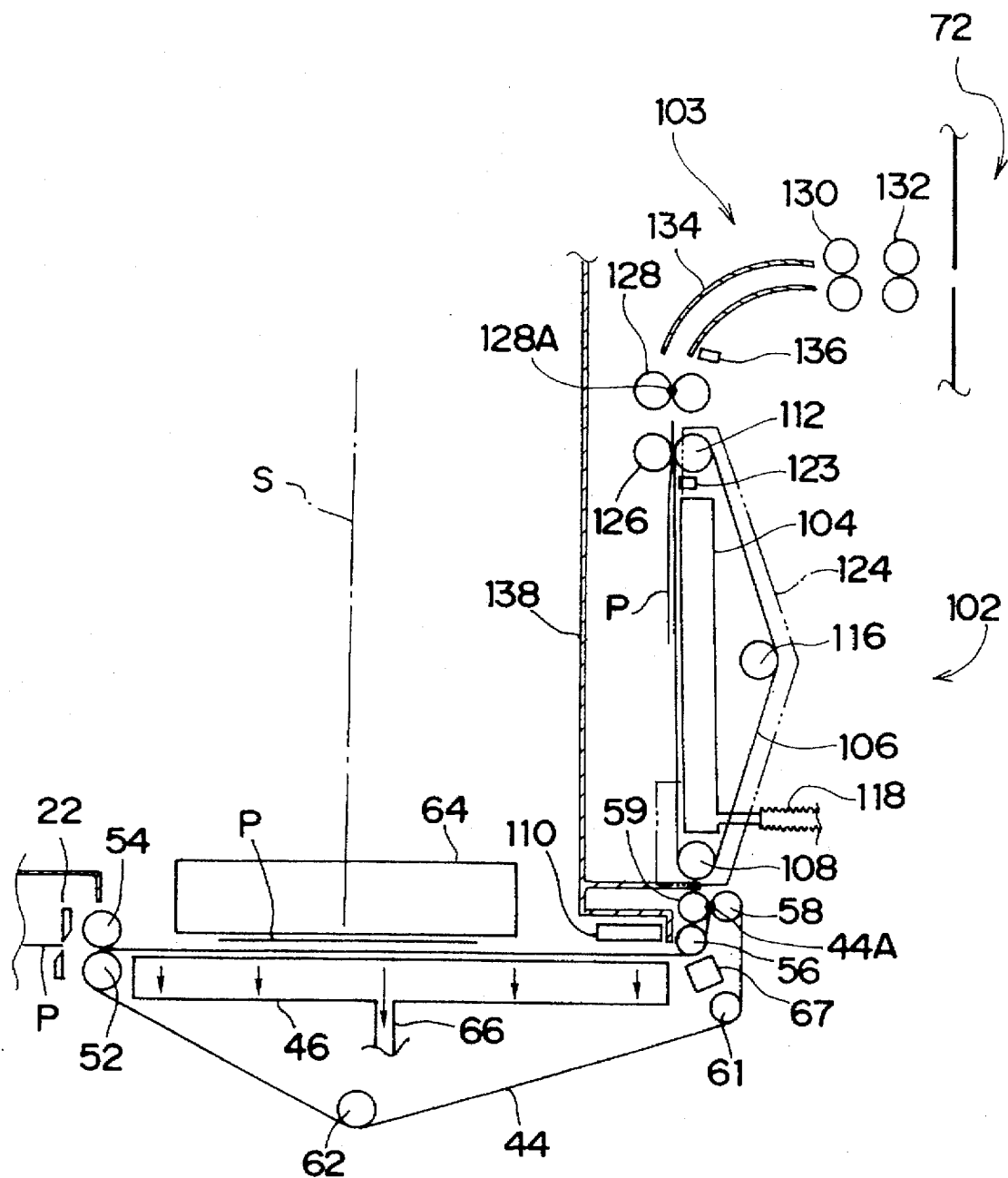
FIG. 9 is a side view, relating to the second embodiment, of the exposure section and the distributing device, and illustrates a state in which the photographic printing paper is conveyed from the first conveying unit to a second conveying unit.

As illustrated in FIGS. 8 and 9, in the present embodiment, the frame 124 of the first conveying unit 102 is slid in the same way as the first embodiment toward the front and the rear of the paper surface of FIGS. 8 and 9, i.e., in directions orthogonal to the conveying direction of the photographic printing paper P. However, in the present embodiment, the frame 124 does not swing and is driven to slide parallel in front and rear directions (the directions of arrows L and R), which is different than the first embodiment. Namely, in the present embodiment the frame 124 is moved to slide along a horizontal plane in two directions which are orthogonal to one another.

Figure 19:
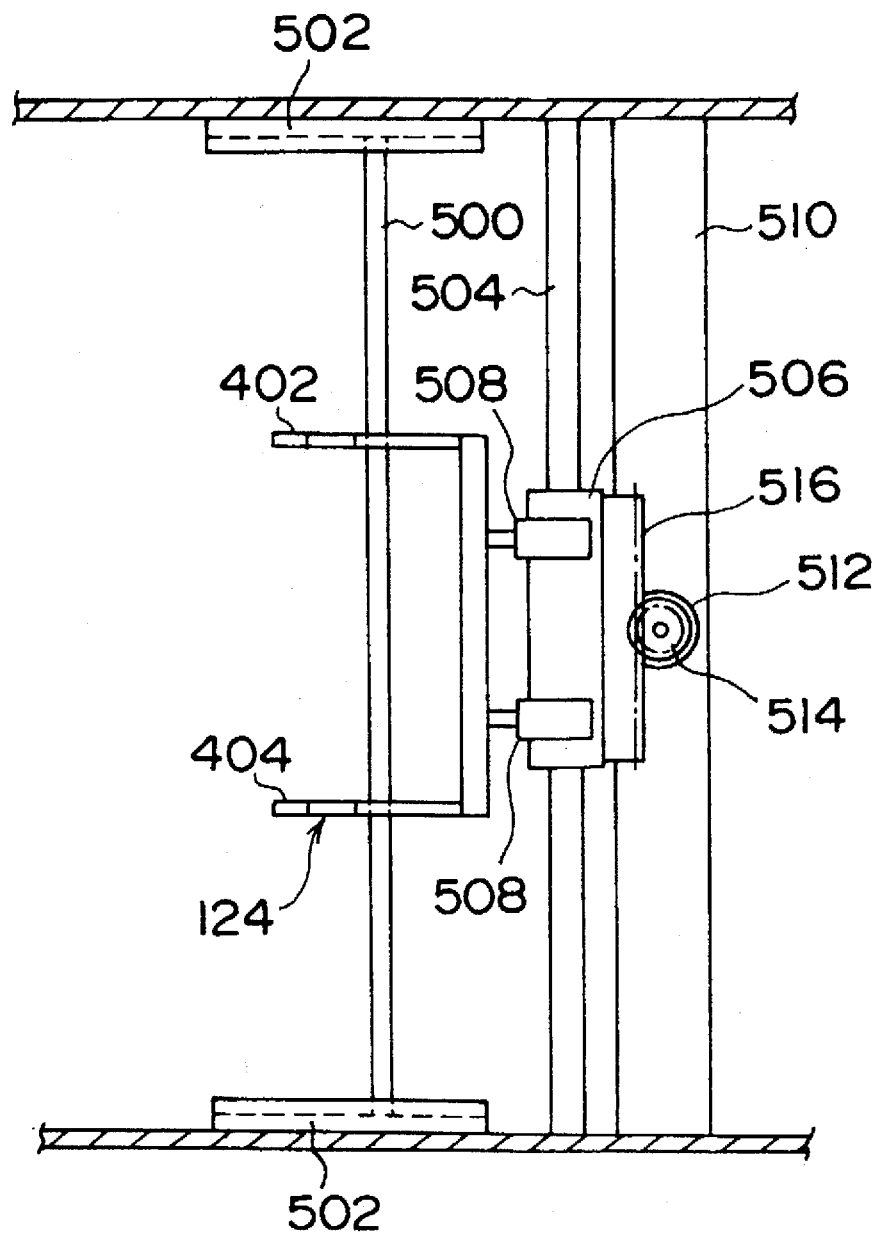
FIG. 19 is a schematic plan view illustrating a slide mechanism for sliding the first conveying unit of the second embodiment in two directions which intersect each other.
Figure 20:
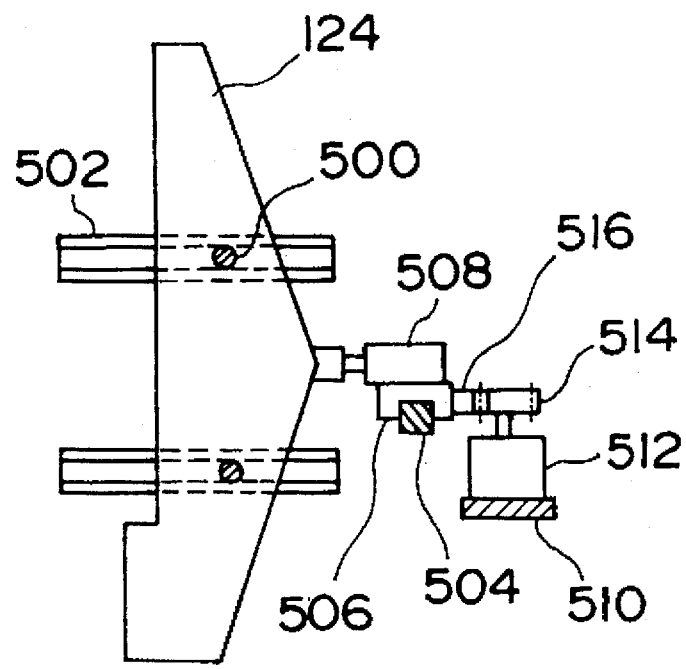
FIG. 20 is a schematic side view illustrating the slide mechanism for sliding the first conveying unit of the second embodiment in two directions which intersect each other.

This structure will be described in more detail hereinafter with reference to FIGS. 19 and 20.

Two guide rods 500 penetrate vertically through the side plates 402, 404 of the frame 124. The frame 124 is supported by the guide rods 500 and is movable along the longitudinal directions thereof. Guide groove members 502, which are elongated and whose longitudinal directions are horizontal and whose cross-sections are substantially U-shaped are fixed to the main body frame of the printer processor 10. One end portion of the guide rod 500 is accommodated within the groove of the guide groove member 502 so as to be movable along the longitudinal direction of the groove. Further, a guide rail 504 is suspended at the main body frame at the rear surface side of the frame 124, i.e., at the right side of the frame 124 in FIGS. 19 and 20. A supporting plate 506 is supported at the guide rail 504 so as to be movable along the longitudinal direction of the guide rail 504. A pair of air cylinders 508 are mounted to the supporting plate 506. The air cylinders 508 are connected to the controller 43, and the extension and contraction of the pistons of the air cylinders 508 are controlled so as to be synchronous. The frame 124 is joined to the respective distal ends of the air cylinders 508. Accordingly, due to the extending of the pistons of the air cylinders 508, the frame 124 advances via the guide rail 504 and the guide rods 500 so as to assume the state illustrated in FIG. 9. Due to the withdrawal of the pistons, the frame 124 withdraws to the state illustrated in FIG. 8. A supporting frame 510 is suspended at the main body frame in a vicinity of the guide rail 504 and parallel to the guide rail 504. A motor 512, whose driving is controlled forward and backward by the controller 43, and a gear mechanism 514, which is rotated and driven by the motor 512, are mounted to the supporting frame 510. A rack 516 is disposed on the supporting plate 506 so as to mesh with the gear mechanism 514. Accordingly, due to the rotation of the gear of the gear mechanism 514 caused by the driving of the motor 512, the supporting plate 506 is guided by the guide rail 504 and is moved in the longitudinal direction of the guide rail 504. The frame 124 which is connected to the supporting plate 506 via the air cylinders 508 is guided by the guide rods 500 so as to be moved along the longitudinal direction of the guide rods 500.

In the second embodiment, when the photographic printing paper P is nipped between the endless belts 44 and the presser roller 59 and is conveyed vertically upward, as illustrated in FIG. 8, the frame 124 of the first conveying unit 102 is positioned at the rear side so as to receive the photographic printing paper P.

In this state, the nip roller 126 and the endless belts 44 are separated by a predetermined dimension. A nip point 128A of the nip rollers 128 at the entrance side of the second conveying unit 103 is at a position which is displaced toward the printing section by a predetermined dimension from a nip point 44A of the endless belts 44 and the presser roller 59.

As illustrated in FIG. 9, when the frame 124 of the first conveying unit 102 moves parallel toward the front side, the endless belts 106 contact the nip roller 126, and the photographic printing paper P can be nipped and conveyed into the second conveying unit 103.

Further, in the present embodiment, the character printing unit 110 is positioned at the left side of the guide roller 56 and prints characters such as the date or the like while the photographic printing paper P is being conveyed to the first conveying unit 102.

In the same way as in the first embodiment, in the present embodiment, the conveying distance of the photographic printing paper P can be made short as compared with a conventional printer processor.

Other operations and effects of the present embodiment are the same as those of the first embodiment.

[Third Embodiment]

A third embodiment of the present invention will be described in accordance with FIGS. 10 and 11. Structures which are the same as those of the previously-described embodiments are denoted by the same reference numerals, and description thereof is omitted.

Figure 10:
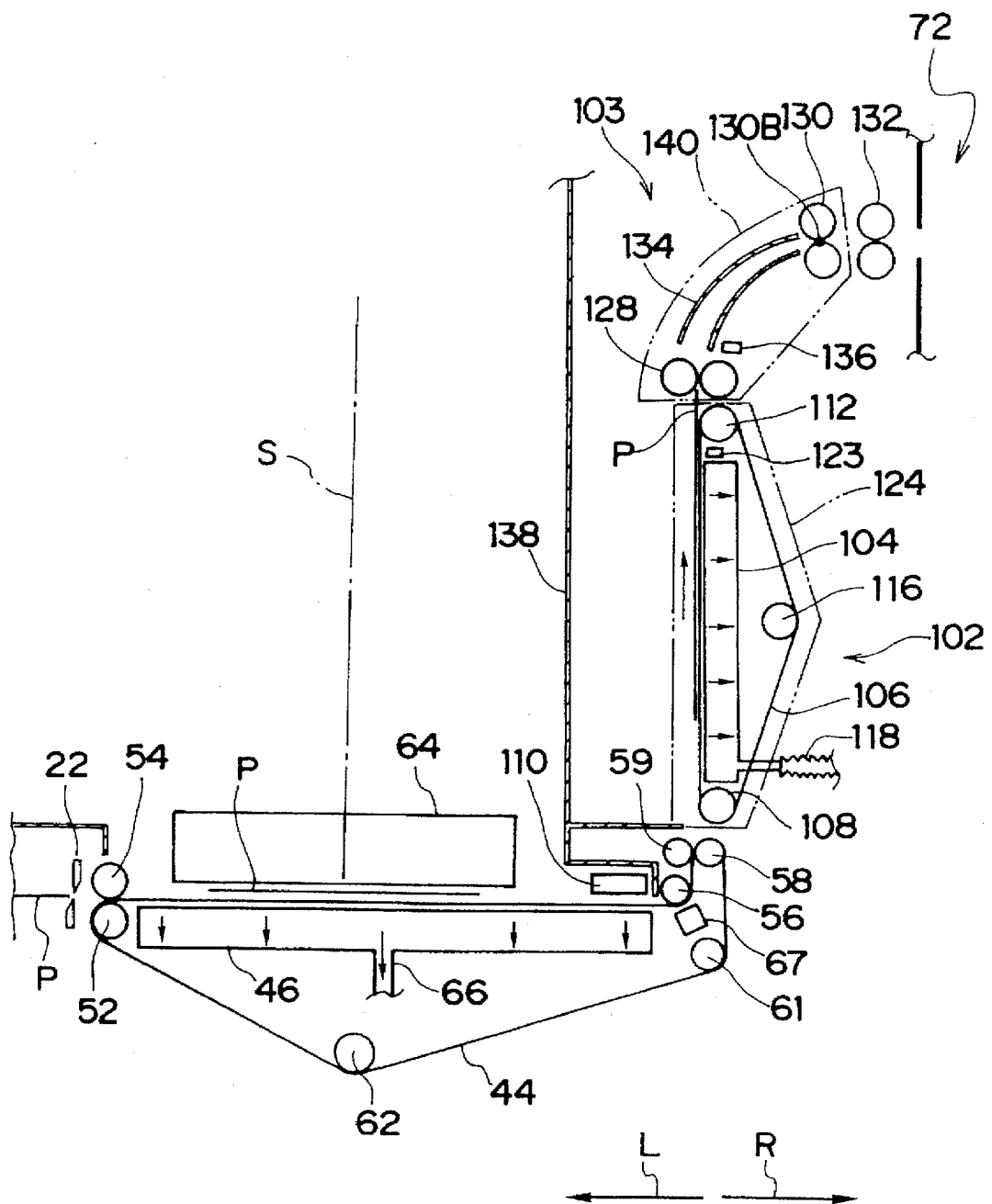
FIG. 10 is a side view, relating to a third embodiment, of an exposure section and a distributing device, and illustrates a state in which a photographic printing paper is conveyed from a first conveying unit to a second conveying unit.
Figure 11:
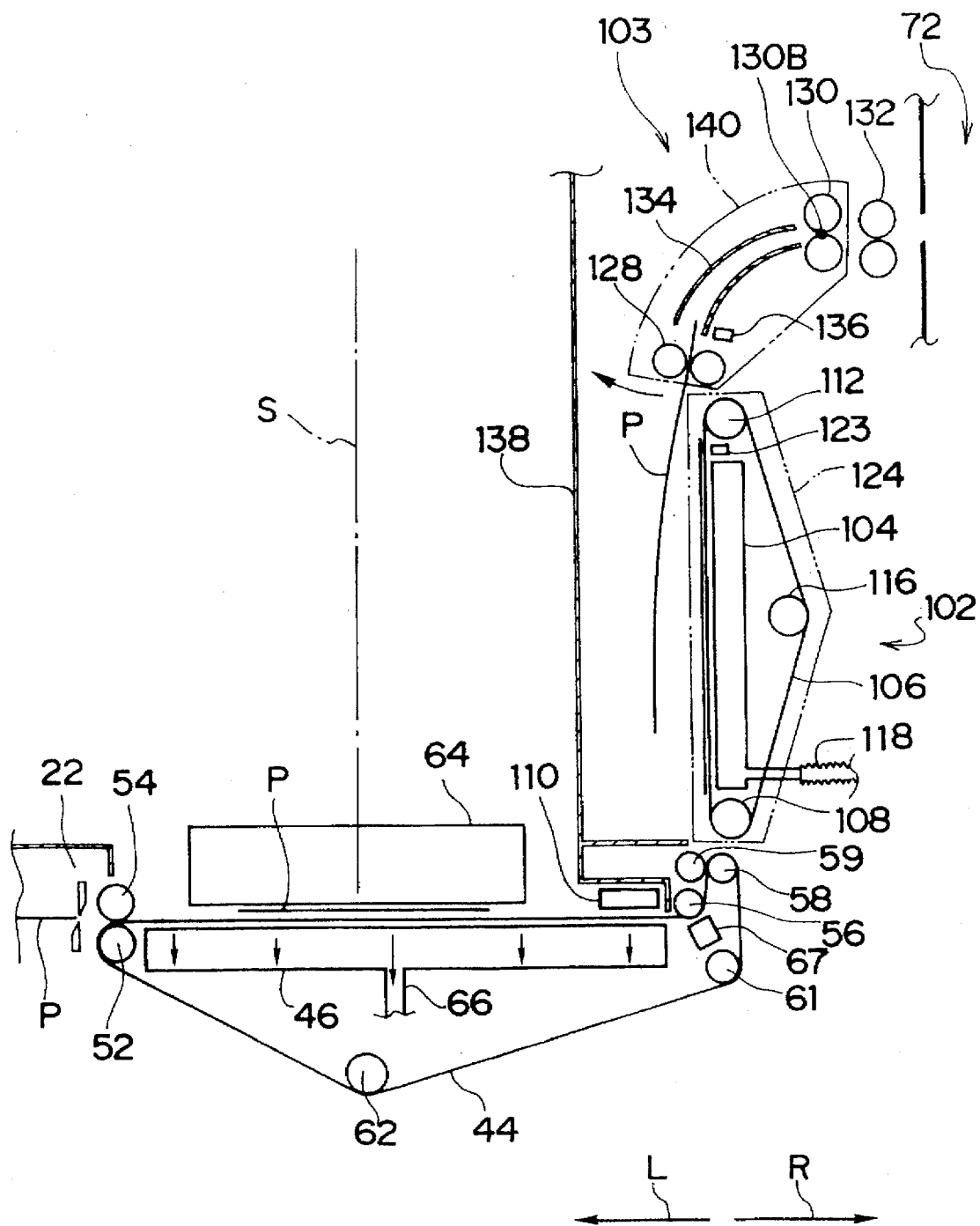
FIG. 11 is a side view, relating to the third embodiment, of the exposure section and the distributing device, and illustrates a state in which the photographic printing paper is conveyed at the second conveying unit.

As illustrated in FIGS. 10 and 11, in the present embodiment, the frame 124 of the first conveying unit 102 is driven to slide only in the transverse directions of the photographic printing paper P, which is different than the previously-described embodiments. The pulley mechanism described in the first embodiment can be used as the mechanism for driving the frame 124 to slide only in the transverse directions of the photographic printing paper P.

In the present embodiment, when the photographic printing paper P is nipped between the endless belts 44 and the presser roller 59 and conveyed vertically upward, the frame 124 is positioned such that the endless belts 106 receive the photographic printing paper P.

Further, in the present embodiment, the nip rollers 128, the curved guide 134, the nip rollers 130 and the sensor 136, all of the second conveying unit 103, are mounted integrally to a frame 140 so as to form a unit.

The frame 140 is supported at the unillustrated frame of the printer processor 10 so as to swing around a nipping point 130B of the nip rollers 130 between the position illustrated in FIG. 10 and the position illustrated in FIG. 11. The frame 140 is driven in the swinging directions by an unillustrated motor. The mechanism of the first embodiment can be used as the mechanism for this swinging.

When the second conveying unit 103 is at the position illustrated in FIG. 10, it is in a receiving state for receiving the photographic printing paper P from the first conveying unit 102. When the leading end of the photographic printing paper P sent out from the first conveying unit 102 is nipped by the nip rollers 128, the frame 140 swings to the position illustrated in FIG. 11 so that the photographic printing paper P is separated from the endless belts 106 of the first conveying unit 102 by a predetermined dimension. When the frame 140 swings to the position illustrated in FIG. 11, suction is stopped.

In the present embodiment, the second conveying unit 103, whose structure is more simple and which is more compact than the first conveying unit 102, is swung. Therefore, the apparatus can be made more simple and more compact.

[Fourth Embodiment]

Figure 12:
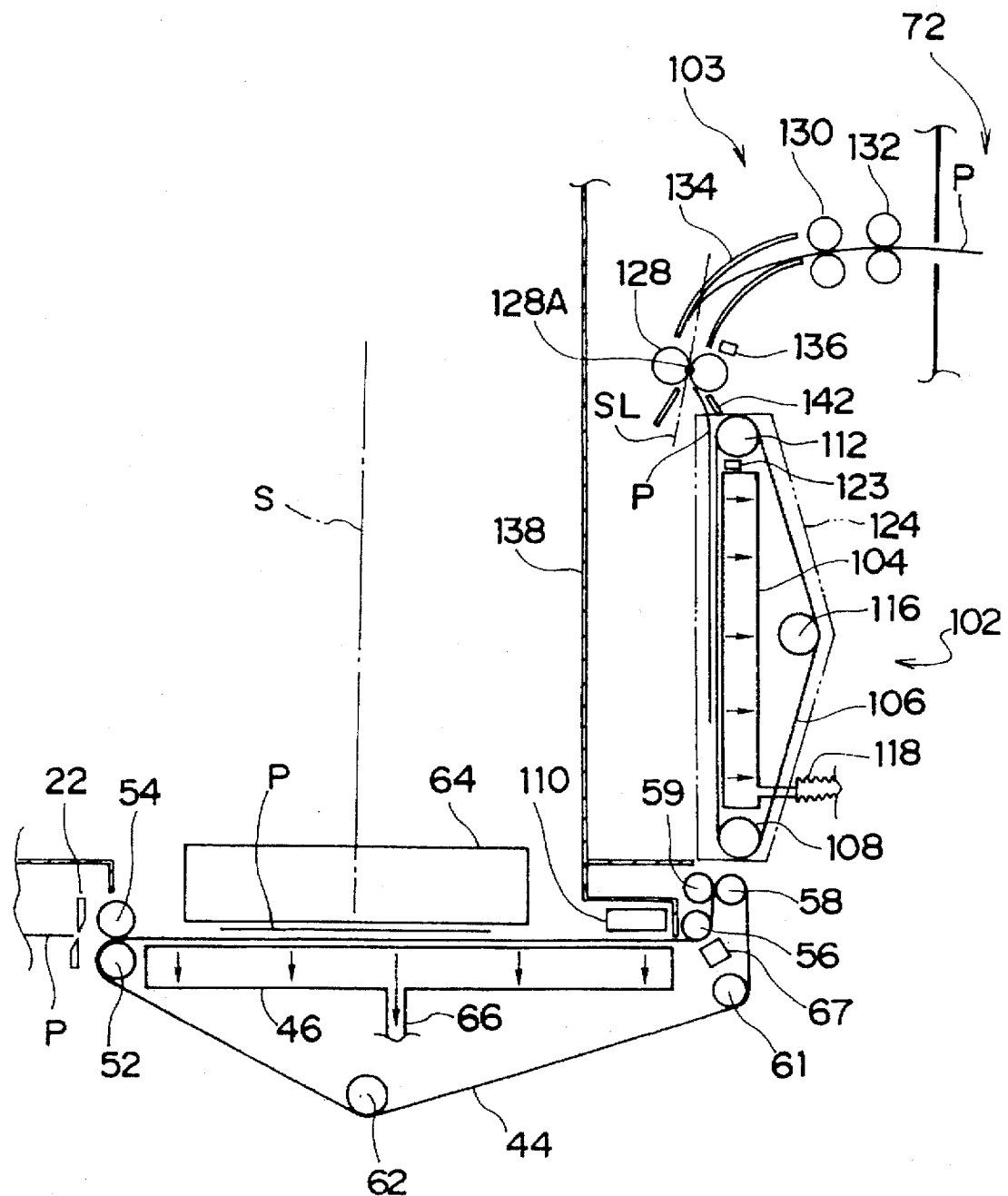
FIG. 12 is a side view, relating to a fourth embodiment, of an exposure section and a distributing device, and illustrates a state in which a photographic printing paper is conveyed from a first conveying unit to a second conveying unit.

A fourth embodiment of the present invention will be described in accordance with FIGS. 12 and 13. Structures which are the same as those of previously-described embodiments are denoted by the same reference numerals, and description thereof is omitted.

In the fourth embodiment, the frame 124 of the first conveying unit 102 is driven to slide only in the transverse directions of the photographic printing paper P, and the second conveying unit 103 is fixed.

In the same way as in the third embodiment, when the photographic printing paper P is nipped by the endless belts 44 and the presser roller 59 and is conveyed vertically upward, the endless belts 106 are positioned to receive the photographic printing paper P.

The nip point 128A of the nip rollers 128 of the second conveying unit 103 is at a position which is separated to the left by a predetermined dimension from an imaginary extension of the conveying surfaces of the endless belts 106 which contact the right side of the photographic printing paper P. Further, the direction of a tangent line SL of the nip rollers 128 which passes through the nip point 128A is angled to the right with respect to the vertical direction.

A guide plate 142 serving as a guiding means is provided at the entraining roller 112 side of the nip rollers 128. The guide plate 142 guides the photographic printing paper P, which is sent out from the endless belts 106, toward the nip point 128A of the nip rollers 128.

In the present embodiment, when the photographic printing paper P is sent out from the first conveying unit 102 to the second conveying unit 103, the photographic printing paper P is sucked until the leading end thereof is nipped by the nip rollers 128 of the second conveying unit 103. As illustrated in FIG. 13, when the leading end of the photographic printing paper P is detected by the sensor 136 and is reliably nipped by the nip rollers 128, the suction is stopped.

Figure 13:
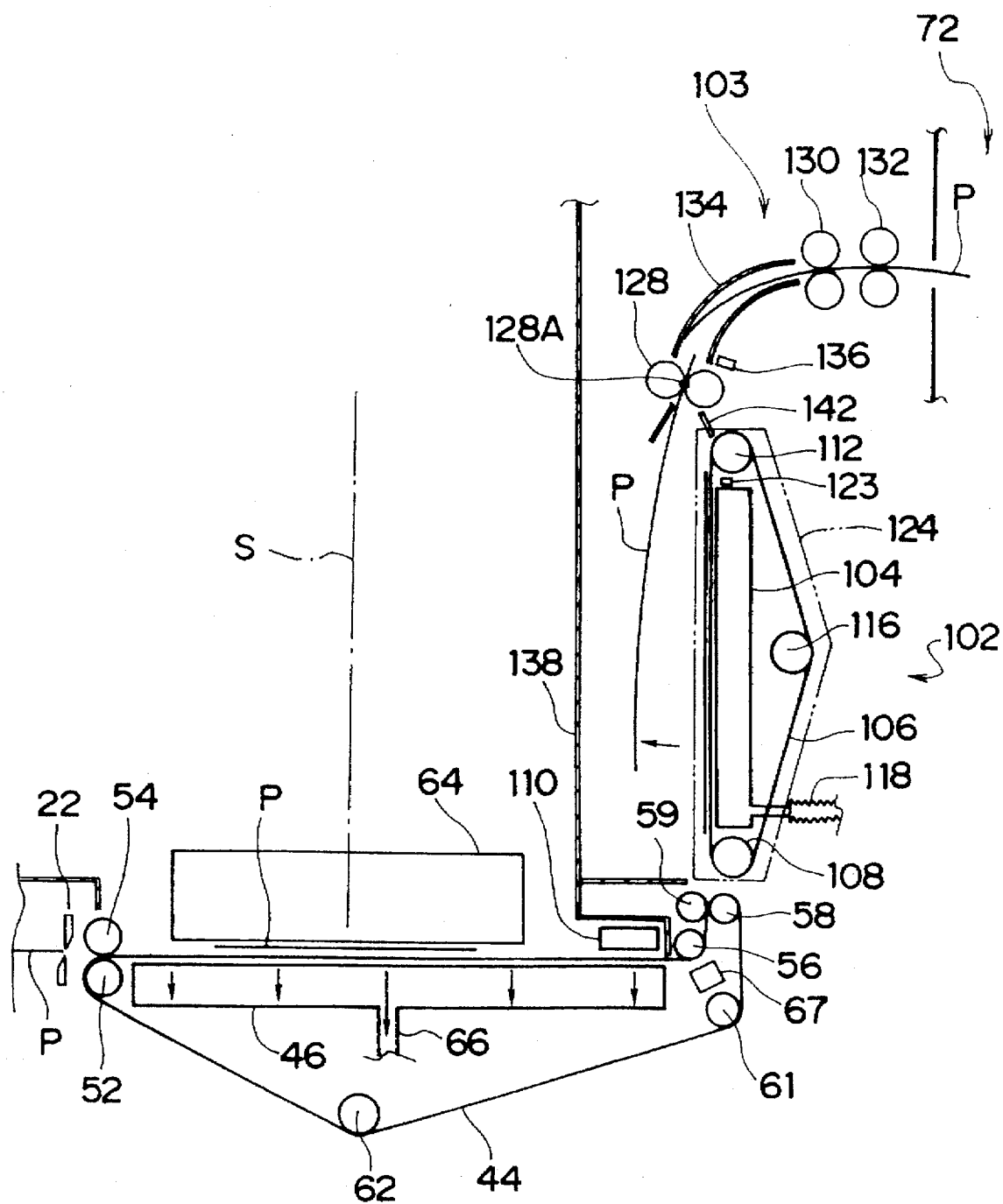
FIG. 13 is a side view, relating to the fourth embodiment, of the exposure section and the distributing device, and illustrates a state in which the photographic printing paper is conveyed at the second conveying unit.

In this way, as illustrated in FIG. 13, the photographic printing paper P separates from the endless belts 106 and is conveyed into the processor section 72.

In the present embodiment, the tangent line SL passing through the nip point 128A of the nip rollers 128, i.e., the conveying path of the photographic printing paper P formed by the nip rollers 128, and the conveying path of the photographic printing paper P formed by the endless belts 106 are separated by a predetermined dimension in the direction of thickness of the photographic printing paper P. Therefore, in the present embodiment, the drive mechanism can be made even more simple than previously-described embodiments.

If the tangent line SL passing through the nip point 128A of the nip rollers 128 is inclined in a direction of separating from the conveying surfaces of the endless belts 106, when suction is canceled, the photographic printing paper P can separate from the endless belts 106 due to the elasticity of the photographic printing paper P itself. Therefore, in such a case, the position of the nip point 128A may be on an imaginary extension of the conveying surfaces of the endless belts 106.

[Fifth Embodiment]

A fifth embodiment of the present invention will be described in accordance with FIGS. 14 and 15. Structures which are the same as those of the previously-described embodiments are denoted by the same reference numerals, and description thereof is omitted.

Figure 14:
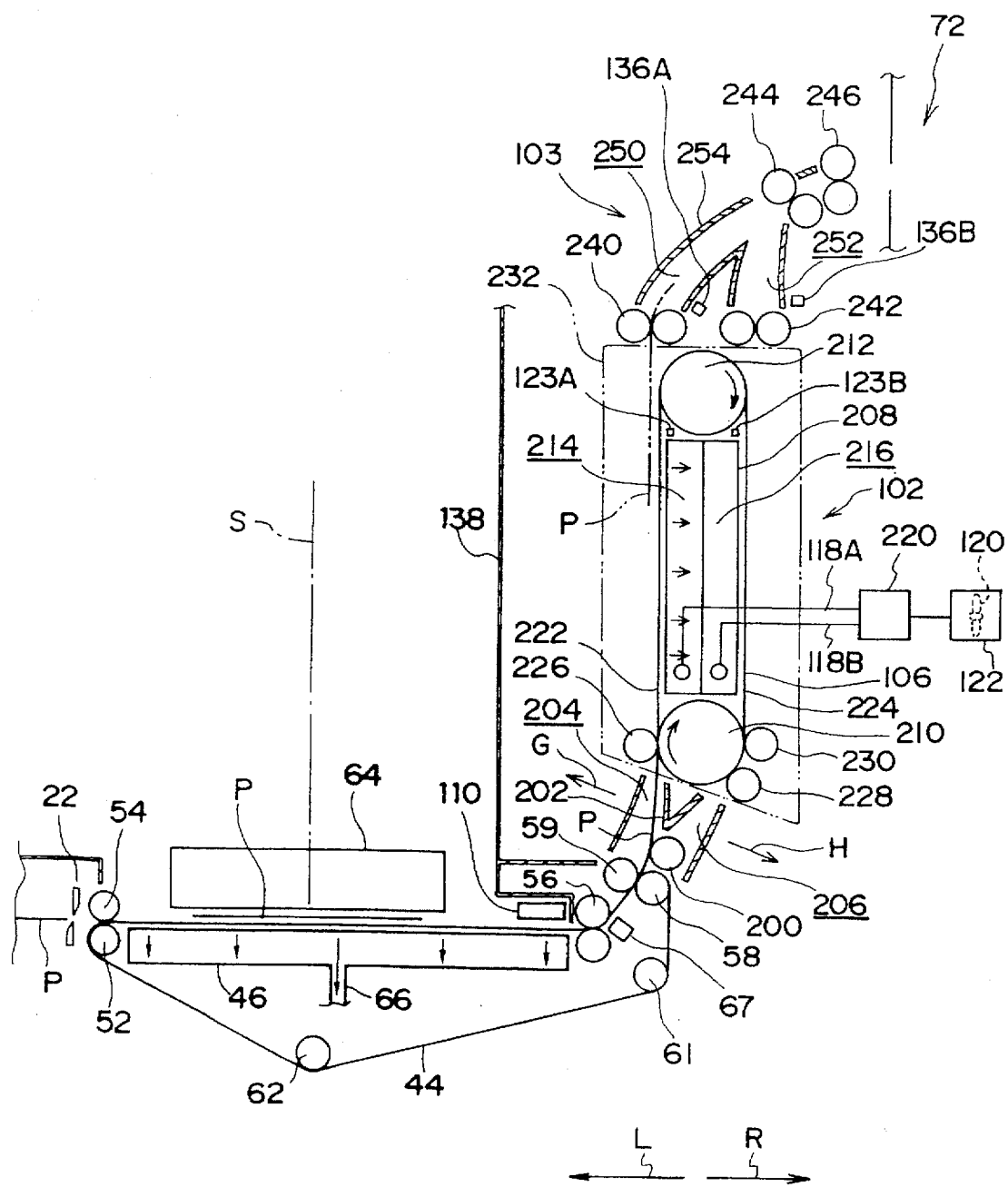
FIG. 14 is a side view, relating to a fifth embodiment, of an exposure section and a distributing device, and illustrates a state in which a photographic printing paper is conveyed to a first conveying portion.

As illustrated in FIG. 14, a distributing roller 200 serving as a distributing means is disposed at the conveying direction downstream side of the entraining roller 58 and the presser roller 59. The distributing roller 200 rotates freely in both clockwise and counterclockwise directions in the figure.

Figure 15:
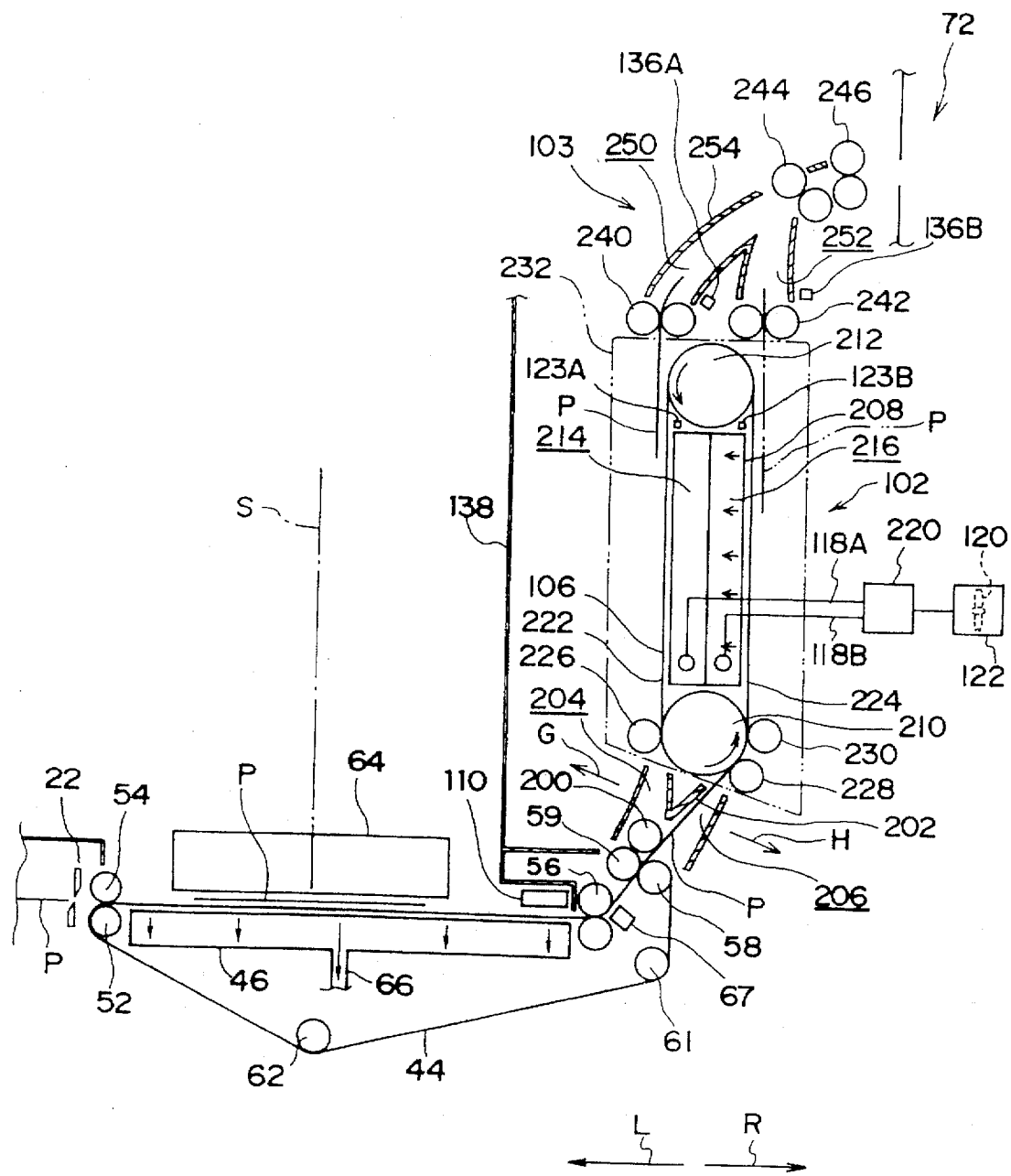
FIG. 15 is a side view, relating to the fifth embodiment, of the exposure section and the distributing device, and illustrates a state in which the photographic printing paper is conveyed to a second conveying portion.

The distributing roller 200 is supported by an unillustrated motor mechanism and is movable in directions of the thickness of the photographic printing paper P as illustrated in FIGS. 14 and 15.

A V-shaped guide plate 202 is disposed above the distributing roller 200. The region at the side of the guide plate 202 in the direction of arrow G is formed as a first conveying path 204, and the region at the side of the guide plate 202 in the direction of arrow H is formed as a second conveying path 206.

The first conveying unit 102 is disposed above the guide plate 202. The first conveying unit 102 of the present embodiment is provided with a supporting stand 208 which is long in the vertical directions in the figure. An entraining roller 210, around which the endless belts 106 are entrained, is disposed at the guide plate 202 side of the supporting stand 208, and an entraining roller 212 is provided at the opposite side of the supporting stand 208. The two endless belts 106 are entrained about the entraining rollers 210, 212 with a predetermined gap being provided between the endless belts 106 in the axial direction of the entraining rollers 210, 212.

The entraining roller 212 is driven and rotated by the drive force of an unillustrated motor, and rotates the endless belts 106 in the clockwise and counterclockwise directions in the figure.

The interior of the supporting stand 208 of the present embodiment is divided into two chambers: a first suction chamber 214 at the side in the direction of arrow L in the figure and a second suction chamber 216 at the side in the direction of arrow R in the figure. A plurality of hole portions (unillustrated) corresponding to the small holes of the endless belts 106 are formed in the respective surfaces of the supporting stand 208 at the sides in the directions of arrows L and R.

A first communicating duct 118A is connected to the first suction chamber 214, whereas a second communicating duct 118B is connected to the second suction chamber 216. The first communicating duct 118A and the second communicating duct 118B are connected, via a selector valve 220, to the fan box 122 provided with the suction fan 120.

The conveying surfaces of the endless belts 106 along the surface of the supporting stand 208 in the direction of arrow L are a first conveying portion 222. The conveying surfaces of the endless belts 106 along the surface of the supporting stand 208 in the direction of arrow R are a second conveying portion 224.

A presser roller 226 is disposed at the arrow L direction side of the entraining roller 210. The photographic printing paper P is nipped between the presser roller 226 and the endless belts 106. Presser rollers 228, 230 are disposed at the arrow R direction side of the entraining roller 210. The photographic printing paper P is nipped between the presser rollers 228, 230 and the endless belts 106.

A sensor 123A, which detects the photographic printing paper P being conveyed at the first conveying portion 222, and a sensor 123B, which detects the photographic printing paper P being conveyed at the second conveying portion 224, are provided between the entraining roller 212 and the supporting stand 208.

In the first conveying unit 102, the supporting stand 208, the entraining roller 210, the entraining roller 212, the sensors 123A, 123B, the presser rollers 226, 228, 230, and the motor (unillustrated) are mounted integrally to a frame 232 so as to form a unit.

The frame 232 is provided so as to slide along a direction orthogonal to the paper surface of FIGS. 14 and 15, and is driven in the sliding direction by an unillustrated motor mechanism.

The second conveying unit 103 is provided above the first conveying unit 102. The second conveying unit 103 is equipped with nip rollers 240, nip rollers 242, nip rollers 244, 246, a guide 254, a sensor 136A, and a sensor 136B. The nip rollers 240 nip and convey the photographic printing paper P which has been sent out from the first conveying portion 222 of the first conveying unit 102. The nip rollers 242 nip and convey the photographic printing paper P which has been sent out from the second conveying portion 224. The nip rollers 244, 246 are provided downstream of the nip rollers 240, 242 in the conveying direction of the photographic printing paper P, and convey the photographic printing paper P to the processor section 72. The guide 254 has a first conveying path 250, which guides the photographic printing paper P conveyed from the nip rollers 240 to the nip rollers 244, and a second conveying path 252, which guides the photographic printing paper P conveyed from the nip rollers 242 to the nip rollers 244. The sensor 136A detects the photographic printing paper P passing through the first conveying path 250. The sensor 136B detects the photographic printing paper P passing through the second conveying path 252.

Next, operation of the present embodiment will be described.

In the same way as the previously-described embodiments, in the present embodiment, photographic printing papers P on which images have been printed are nipped by the endless belts 44 and the presser roller 59 and are sent out at high speed to the first conveying unit 102. However, in the present embodiment, the photographic printing papers P are alternately distributed by the distributing roller 200 to the first conveying portion 222 and the second conveying portion 224 of the first conveying unit 102.

For example, as illustrated in FIG. 14, first, the distributing roller 200 is moved in the direction of arrow H. The first photographic printing paper P passes through the first conveying path 204 and is conveyed to the first conveying portion 222 of the first conveying unit 102. Then, the endless belts 106 are rotated clockwise, and the first photographic printing paper P is temporarily held in a standby state on the endless belts 106. The stopping of the conveying of the photographic printing paper P is effected by the detection of the leading end thereof by the sensor 123A. In this way, preparations for the next exposure can be effected immediately at the exposure section.

While the photographic printing paper P is being conveyed from the image printing position to the first conveying unit 102, printing of characters (the frame number or the like) on the reverse surface of the photographic printing paper P is effected at the character printing unit 67. When the date, a message, or the like is to be printed, such printing is carried out at the character printing unit 110.

When the photographic printing paper P is conveyed by the first conveying unit 102, the selector valve 220 connects the first suction chamber 214 of the supporting stand 208 to the fan box 122. By sucking the air within the first suction chamber 214, the photographic printing paper P is sucked to the endless belts 106.

When the first photographic printing paper P is discharged to the first conveying portion 222, an unexposed photographic printing paper P which has been cut to a predetermined length is immediately conveyed to the image printing position by the endless belts 44, and print-exposure of the image of the second frame is effected.

The first conveying unit 102, which is holding the first photographic printing paper P on which an image has been printed, is slid a predetermined amount in either direction of the transverse directions of the photographic printing paper P (the directions orthogonal to the paper surface of the figure). For example, the first conveying unit 102 is slid to the rear of the paper surface of the figure. The determination as to which of the rows the photographic printing paper P will be distributed can be effected by the sensors 136A, 136B of the second conveying unit 103 detecting the passage of the photographic printing paper P.

Next, the endless belts 106 are driven clockwise, and the leading end of the photographic printing paper P is nipped by the nip rollers 240 of the second conveying unit 103.

As illustrated by the imaginary line (the two-dotted chain line) in FIG. 14, when the leading end of the photographic printing paper P is nipped by the nip rollers 240, the sucking of the photographic printing paper P is stopped by stopping the suction fan 120, and the photographic printing paper P is no longer sucked to the endless belts 106. Thereafter, the first conveying unit 102 is slid a predetermined amount toward the front of the paper surface of the figure and is returned to its original standby position.

The photographic printing paper P separates from the endless belts 106 and is pulled in a vertical state by the nip rollers 240 of the second conveying unit 103 so as to be conveyed upward. The photographic printing paper P is then sent into the processor section 72 via the first conveying path 250 and the nip rollers 244, 246. The conveying speed of the second conveying unit 103 is a slow speed which conforms with the conveying speed of the processor section 2.

When the first conveying unit 102 is returned to the standby position, the distributing roller 200 is moved in the direction opposite the direction in which it was moved previously, i.e., the distributing roller 200 is moved in the direction of arrow G as illustrated in FIG. 15. Further, the suction fan 120 is operated, the selection valve 220 is switched over, and the second photographic printing paper P is immediately sent into the second conveying portion 224 of the first conveying unit 102. At this time, the endless belts 106 of the first conveying unit 102 are rotated counterclockwise.

When the second photographic printing paper P is nipped by the second conveying portion 224 and temporarily held in a standby state, the first conveying unit 102 is moved a predetermined amount toward the side opposite the side at the time of moving the first photographic printing paper P (i.e., the first conveying unit 102 is moved toward the front of the paper surface in the figure). Thereafter, when the photographic printing paper P is conveyed and is nipped by the nip rollers 242 of the second conveying unit 103, the suction fan 120 is stopped. As illustrated by the imaginary line (the two-dotted chain line) in FIG. 15, the photographic printing paper P separates from the endless belts 106 and is pulled in a vertical state by the nip rollers 242 of the second conveying unit 103 so as to be conveyed upward. The photographic printing paper P is then sent into the processor section 72 via the second conveying path 252 and the nip rollers 244, 246. Thereafter, the first conveying unit 102 is slid a predetermined amount toward the rear of the paper surface of the figure, and is returned to its original standby position.

Thereafter, in the same way as described above, photographic printing papers P on which images have been printed are distributed by the distributing roller 200 in the direction of thickness of the photographic printing paper P, are alternately distributed in transverse directions of the photographic printing paper P, and are sent in parallel into the processor section 72.

In the present embodiment, the distributing roller 200, the first conveying unit 102 and the like take the place of the accumulator of the conventional printer processor. Even if the conveying speed of the photographic printing papers P discharged from the print-exposure section is faster than the conveying speed in the processor section 72, this difference in speeds can be absorbed, and therefore, the capability of the processor section 72 can be utilized effectively. Accordingly, with the printer processor 10 of the present embodiment, the conveying distance of the photographic printing paper P can be made short, as compared to a conventional printer processor requiring an accumulator before or after distribution. Therefore, the space in the conveying direction can be made shorter, and the apparatus can be made more compact and at a lower cost.

In a case in which a wide photographic printing paper P is processed, it suffices to convey the photographic printing paper P by either the first conveying portion 222 or the second conveying portion 224 of the first conveying unit 102, without moving the first conveying unit 102 and the distributing roller 200.

In the above-described embodiments, examples are described in which images of the negative film N are printed onto the photographic printing paper P. However, image information recorded on any of various types of recording media, such as a floppy disk, a photomagnetic disk, a CD-ROM, a photo CD, an LSI memory or the like, may be printed onto the photographic printing paper P by laser light or the like.

Further, an image may be recorded (printed) onto a recording medium other than the photographic printing paper P.

In the above-described embodiments, the photographic printing papers P are distributed into two rows, and parallel conveying/processing is carried out. However, if the amount of sliding of the frame 124 is increased and width of the processor section 72 is increased, parallel conveying/processing can be carried out in three rows or more.

Further, in the above-described embodiments, the photographic printing paper P is sucked to the endless belts by sucking air. However, a static electricity generating device may be connected to the endless belts so that the photographic printing paper P may be held to the endless belts by electrostatic attraction.

What is claimed is:

1. A method of processing recording media comprising the steps of:
    (a) successively recording at least one image information recorded on a first recording medium onto second recording media at a recording section;
    (b) distributing the second recording media, on which the image information has been recorded, into plural rows by a distributing means, wherein when the second recording media are distributed into plural rows, the distributing means receives a subsequently distributed second recording medium from the recording section at a second position which is separated by a predetermined amount in a direction having a component in a direction of thickness of the second recording media, from a first position at which a second recording medium distributed previously by the distributing means is sent out to any one row of the plural rows; and
    (c) effecting a predetermined processing at a conveying/processing device while successively receiving and conveying in parallel the second recording media which have been sent out.

2. A method of processing recording media according to claim 1, wherein in said step (b), after the distributing means has at the second position received the subsequently-distributed second recording medium from the recording section, the distributing means is moved to a third position which is positioned in a direction intersecting a direction in which the subsequently-distributed second recording medium is conveyed by the conveying/processing device.

3. A method of processing recording media according to claim 2, wherein in said step (b), after the distributing means has been moved to the third position, the distributing means is moved to the first position.

4. A method of processing recording media according to claim 2, wherein movement of the distributing means from the second position to the third position is effected by sliding.

5. A method of processing recording media according to claim 3, wherein movement of the distributing means from the third position to the first position is effected by sliding.

6. A method of processing recording media according to claim 3, wherein movement of the distributing means from the third position to the first position is effected by swinging.

7. An apparatus for processing recording media comprising:

recording means for recording image information recorded on a first recording medium onto a sheet-shaped second recording medium;

a conveying/processing device for effecting a predetermined processing while conveying the second recording medium onto which the image information has been recorded;

first conveying means, provided between said recording means and said conveying/processing device, for enabling switching of a state of a second recording medium received from said recording means between a held state and a non-held state, and for enabling the second recording medium to be sent out therefrom in a held state;

second conveying means for receiving the second recording medium sent out from said first conveying means, and for sending out the received second recording medium to said conveying/processing device;

first moving means for, after said first conveying means has received the second recording medium, moving said first conveying means in a transverse direction of the second recording medium which direction intersects a direction in which the second recording medium is sent out to said second conveying means; and second moving means for, when at least one of said first conveying means and said second conveying means receives the second recording medium, moving said at least one of said first conveying means and said second conveying means in a first direction having a component in a direction of thickness of the second recording medium so as to position said at least one of said first conveying means and said second conveying means at a first position, and for, when said at least one of said first conveying means and said second conveying means sends out the second recording medium, moving said at least one of said first conveying means and said second conveying means in a second direction which is opposite to the first direction so as to position said at least one of said first conveying means and said second conveying means at a second position.

8. An apparatus for processing recording media according to claim 7, wherein said first moving means includes a slide mechanism which moves said first conveying means in the transverse direction of the second recording medium by sliding said first conveying means.

9. An apparatus for processing recording media according to claim 7, wherein said second moving means includes a slide mechanism which moves said at least one of said first conveying means and said second conveying means in the first direction and the second direction by sliding said at least one of said first conveying means and said second conveying means.

10. An apparatus for processing recording media according to claim 7, wherein said second moving means includes a swinging mechanism which moves said at least one of said first conveying means and said second conveying means in the first direction and the second direction by swinging said at least one of said first conveying means and said second conveying means.

11. An apparatus for processing recording media according to claim 7, wherein said first conveying means is structured so as to hold the second recording medium by suction.

12. An apparatus for processing recording media comprising:

recording means for recording image information recorded on a first recording medium onto a sheet-shaped second recording medium;

a conveying/processing device for effecting a predetermined processing while conveying the second recording medium onto which the image information has been recorded;

conveying means, provided between said recording means and said conveying/processing device, for enabling switching of a state of a second recording medium received from said recording means between a held state and a non-held state, and for enabling the second recording medium to be sent out therefrom in a held state;

first moving means for, after said conveying means receives the second recording medium, moving said conveying means in a transverse direction of the second recording medium which direction intersects a direction in which the second recording medium is sent out; and second moving means for, when said conveying means receives the second recording medium, moving said conveying means in a first direction having a component in a direction of thickness of the second recording medium so as to position said conveying means at a first position, and for, when said conveying means sends out the second recording medium, moving said conveying means in a second direction which is opposite to the first direction so as to position said conveying means at a second position.

13. An apparatus for processing recording media according to claim 12, wherein said first moving means includes a slide mechanism which moves said conveying means in the transverse direction of the second recording medium by sliding said conveying means.

14. An apparatus for processing recording media according to claim 12, wherein said second moving means includes a slide mechanism which moves said conveying means in the first direction and the second direction by sliding said conveying means.

15. An apparatus for processing recording media according to claim 12, wherein said second moving means includes a swinging mechanism which moves said conveying means in the first direction and the second direction by swinging said conveying means.

16. An apparatus for processing recording media according to claim 12, wherein said conveying means is structured so as to hold the second recording medium by suction.

17. An apparatus for processing recording media comprising:

recording means for recording image information recorded on a first recording medium onto a sheet-shaped second recording medium;

a conveying/processing device for effecting a predetermined processing while conveying the second recording medium onto which the image information has been recorded;

first conveying means, provided between said recording means and said conveying/processing device, for enabling switching of a state of a second recording medium received from said recording means between a held state and a non-held state, and for enabling the second recording medium to be sent out therefrom in a predetermined direction in a held state;

second conveying means having a receiving path, at least one of whose position and direction is different from a position and a direction of a send-out path of the second recording medium through which the second recording medium is sent out from said first conveying means, said second conveying means receiving the second recording medium sent out from said first conveying means and sending out the received second recording medium to said conveying/processing device;

guide means, provided between said first conveying means and said second conveying means, for guiding the second recording medium, which was sent out from said first conveying means, to the receiving path of said second conveying means; and moving means for moving said first conveying means in a transverse direction of the second recording medium which direction intersects a direction in which the second recording medium is sent out.

18. An apparatus for processing recording media according to claim 17, wherein said moving means includes a sliding mechanism which moves said first conveying means in the transverse direction of the second recording medium by sliding said first conveying means.

19. An apparatus for processing recording media according to claim 17, wherein said first conveying means is structured so as to place the second recording medium in the held state by suction.

20. An apparatus for processing recording media comprising:

recording means for recording image information recorded on a first recording medium onto a sheet-shaped second recording medium;

a conveying/processing device for effecting a predetermined processing while conveying the second recording medium onto which the image information has been recorded;

distributing means, provided between said recording means and said conveying/processing device, for distributing the second recording medium received from said recording means to one of a first conveying path and a second conveying path, respective conveying directions of the first conveying path and the second conveying path being different from a direction having a component in a direction of thickness of the second recording medium;

first conveying means having a first conveying portion, which is positioned at a second recording medium conveying direction downstream side of the first conveying path, and a second conveying portion, which is positioned at a second recording medium conveying direction downstream side of the second conveying path, said first conveying means enabling switching of a state of a received second recording medium between a held state and a non-held state, and enabling the second recording medium to be sent out therefrom in a held state;

moving means for moving said first conveying means in a transverse direction of the second recording medium which direction intersects a direction in which the second recording medium is sent out toward said conveying/processing device; and second conveying means, provided between said first conveying means and said conveying/processing device, for conveying to said conveying/processing device the second recording medium sent out from said first conveying means.

21. An apparatus for processing recording media according to claim 20, wherein said moving means includes a slide mechanism which moves said first conveying means in the transverse direction of the second recording medium by sliding said first conveying means.

22. An apparatus for processing recording media according to claim 20, wherein said first conveying portion and said second conveying portion have parallel conveying surfaces for conveying the second recording medium.

23. An apparatus for processing recording media according to claim 20, wherein said first conveying portion and said second conveying portion are structured so as to place the second recording medium in a held state by suction.

* * * * *